US006756837B2

United States Patent
Kawai et al.

(10) Patent No.: US 6,756,837 B2
(45) Date of Patent: Jun. 29, 2004

(54) BOOSTER CIRCUIT

(75) Inventors: Ken Kawai, Osaka (JP); Makoto Kojima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/320,641

(22) Filed: Dec. 17, 2002

(65) Prior Publication Data

US 2003/0122612 A1 Jul. 3, 2003

(30) Foreign Application Priority Data

Dec. 17, 2001 (JP) ........................................ 2001-382877

(51) Int. Cl.[7] ............................................... G05F 1/10
(52) U.S. Cl. ....................................................... 327/536
(58) Field of Search ................................. 327/530, 534, 327/535, 536, 537

(56) References Cited

U.S. PATENT DOCUMENTS 6,278,316 B1   8/2001  Tanzawa et al.
6,480,057 B2 * 11/2002  Ogura ........................ 327/536
2001/0033515 A1  10/2001  Tanzawa

FOREIGN PATENT DOCUMENTS

JP        2001-268893        9/2001

* cited by examiner

Primary Examiner—Jeffrey Zweizig
(74) Attorney, Agent, or Firm—McDermott, Will & Emery

(57) ABSTRACT

The booster circuit includes a voltage reset circuit in a booster cell. The voltage reset circuit receives a gate voltage reset signal via a reset terminal of the booster circuit. The reset signal is asserted during abrupt change of the boosted voltage from high to low or during a restart after an instantaneous power interruption. The voltage reset circuit grounds the gate terminal of a charge-transfer transistor during the assertion of the gate voltage reset signal, to reset the gate potential of the charge-transfer transistor to the ground potential. By this resetting, normal boost operation is secured even in an event that a switching transistor remains cut-off because the amplitude of a boost clock signal is small due to use of low-voltage power supply.

37 Claims, 18 Drawing Sheets

VOLTAGE RESET CIRCUIT

VOLTAGE RESET CIRCUIT

VOLTAGE RESET CIRCUIT

VOLTAGE RESET CIRCUIT

US 6,756,837 B2

BOOSTER CIRCUIT

BACKGROUND OF THE INVENTION

The present invention relates to booster circuits used for nonvolatile semiconductor memories and semiconductor integrated circuits.

In recent years, in nonvolatile semiconductor memories such as flash EEPROMs, booster circuits have been widely used for supply of various levels of high voltages for write, erase and read operations. In particular, as such booster circuits, used extensively are threshold-offset type booster circuits driven with a four-phase clock signal that are excellent in low-voltage operation and boost efficiency.

A conventional four-phase clock driven threshold-offset type booster circuit will be described with reference to FIG. 21. The booster circuit of FIG. 21 is a four-stage booster circuit including four booster cells 1a to 1d connected in series. A rectifying transistor Md is connected to the output of the final-stage booster cell 1d for outputting an output voltage VPP. A limit circuit 2 and a smoothing capacitor Co are connected to the output of the rectifying transistor Md. The limit circuit 2 is essentially composed of a read Zener diode DZ1 having a breakdown voltage of 5V used for read operation, a rewrite Zener diode DZ2 having a breakdown voltage of 10V used for write/erase operations, and a switch 3. By controlling the switch 3 with a switch control signal ACTH, the output voltage VPP is switched between 10V and 5V.

Each of the booster cells 1a to 1d is driven with two boost clock signals having different phases (CLK1 and CLK3 or CLK2 and CLK4) as shown in FIG. 22. The clock signals CKL1 to CKL4 are square waves having predetermined "H" and "L" durations and cycles. The booster cells 1a to 1d have an identical configuration to each other, which may be that disclosed in Japanese Laid-Open Patent Publication No. 2001-268893, for example. FIG. 23 shows an example of internal configuration of the final-stage booster cell 1d. Referring to FIG. 23, the booster cell 1d includes an N-channel charge-transfer transistor M1, an N-channel switching transistor M2 and two boost capacitors C1 and C2. The booster cell 1d receives the clock signal CLK4 at one clock terminal CLKS, an inverted signal NCLK2 of the clock signal CLK2 at the other clock terminal CLKM, and a boosted voltage from the preceding-stage booster cell 1c at an input terminal VIN, and outputs a boosted voltage from an output terminal VO to the rectifying transistor Md.

The operation of the conventional booster circuit having the configuration described above will be described.

In the booster circuit of FIG. 21, charge is stored in the boost capacitors C1 of the booster cells sequentially, starting from the first-stage booster cell 1a to the second-stage, third-stage and fourth-stage cells, to finally obtain an arbitrary high voltage. For example, a voltage boosted in the third-stage booster cell 1c is transferred from the boost capacitor C1 of the third-stage booster cell 1c to the boost capacitor C1 of the fourth-stage booster cell 1d. During this voltage transfer, in the final-stage booster cell 1d, the boost clock signal CLK4 input to the boost capacitor C2 is changed from the ground potential to the supply potential at timing T6 shown in FIG. 22, so that the gate voltage of the charge-transfer transistor M1 is sufficiently increased. With the sufficiently high gate voltage, it is possible to prevent voltage drop occurring when the boosted voltage is transferred from the third stage to the boost capacitor C1 via the charge-transfer transistor M1. Thereafter, at timing T8, the inverted clock signal NCLK2 input to the clock terminal CLKM is changed from the ground potential to the supply potential (that is, the clock signal CLK2 is changed from the supply potential to the ground potential), so that the boosted voltage transferred to the boost capacitor C1 is further boosted. By repeating this boost operation sequentially in the first to fourth stages, a boosted voltage higher than the supply voltage Vcc can be generated. In the fourth-stage booster cell 1d, at timing T8 in the next cycle, in which the inverted clock signal NCLK2 input to the clock terminal CLKM of the fourth-stage booster cell 1d is changed from the ground potential to the supply potential (that is, the clock signal CLK2 is changed from the supply potential to the ground potential), the gate-source voltage Vgs of the switching transistor M2 exceeds the threshold voltage Vth of this transistor, turning ON the switching transistor M2. In this state, the charge at the gate of the charge-transfer transistor M1 can be drawn to the input terminal VIN, and thus the gate voltage of this transistor decreases.

The limit circuit 2 can change the output voltage VPP to a predetermined voltage in response to the switch control signal ACTH. To state specifically, during write operation requiring a high voltage, the switch control signal ACTH is asserted, to connect the rewrite Zener diode DZ2 to the output terminal of the booster circuit so that the output voltage VPP is clamped to 10V. During read operation requiring a low voltage, the switch control signal ACTH is negated, to connect the read Zener diode DZ1 to the output terminal of the booster circuit so that the output voltage VPP is clamped to 5V. In this way, the output voltage VPP of the booster circuit can be changed according to the operation mode before supply for use.

However, it has been found that, as the voltage level of the power supply is made lower in the future, the conventional booster circuit described above will have a problem as follows when the output boosted voltage is abruptly switched from a high voltage to a low voltage, such as during a specific mode transition including transition from the data rewrite mode to the read mode and transition from the rewrite mode to the program verify mode, and during an instantaneous power interruption.

That is, referring to FIG. 24, during a specific mode transition or during an instantaneous power interruption as described above, in which the boosted voltage is switched to a low voltage, the source voltage Vs of the ON-state charge-transfer transistor M1 of the fourth-stage booster cell 1d abruptly decreases, and with this, the drain voltage Vd also abruptly decreases, resulting in that the source voltage Vs and the drain voltage Vd become roughly an identical potential. Thus, the gate voltage Vg of the switching transistor M2 and the source voltage Vs of the same transistor (that is, the drain voltage Vd of the charge-transfer transistor M1) become an identical potential. As a result, the switching transistor M2 is cut off, leaving the gate of the charge-transfer transistor M1 at a high voltage.

If the power supply is at a high voltage, that is, the amplitude of the boost clocks CLK1 to CLK4 is large, the fourth-stage booster cell 1d will operate as follows. When the inverted clock NCLK2 of the boost clock CLK2 is input to the terminal CLKM of the booster cell 1d, the gate voltage Vg of the switching transistor M2 becomes sufficiently high due to the H level of the inverted clock NCLK2. Therefore, the gate-source voltage Vgs of the switching transistor M2 exceeds the threshold voltage, turning ON the switching transistor M2. As a result, the charge at the gate of the charge-transfer transistor M1 is released, preventing the gate from being left at a high voltage.

On the contrary, if the power supply is at a low voltage, the amplitude of the boost clocks CLK1 to CLK4 is small. Therefore, when the inverted clock NCLK2 of the boost clock CLK2 is input, the gate voltage Vg of the switching transistor M2 fails to become sufficiently high due to the H level of the inverted clock NCLK2. Thus, the gate-source voltage Vgs of the switching transistor M2 may not exceed the threshold voltage Vt. In this case, the switching transistor M2 remains in the cut-off state irrespective of changes of the boost clocks CLK2 and CLK4, leaving the gate of the charge-transfer transistor M1 at a high voltage. As a result, the gate-source voltage Vgs of the charge-transfer transistor M1 is kept greater than the threshold voltage Vt (0.51 V) and thus the charge-transfer transistor M1 remains in the ON state. This causes failure of desired boost operation, degrades the current supply capability of the booster circuit, and decreases the boosted voltage VPP. As a result, good normal operation of a circuit to which the boosted voltage is supplied may not be secured.

As described above, the conventional booster circuit has a problem that, when the amplitude of the boost clock signals CLK1 to CLK4 is small due to a low voltage of the power supply, normal boost operation may fail and the current supply capability of the booster circuit may degrade after a specific mode transition or during a restart after an instantaneous power interruption as described above.

SUMMARY OF THE INVENTION

An object of the present invention is providing a highly reliable booster circuit capable of securing ON/OFF of a charge-transfer transistor as desired to enable stable boost operation under use of low-voltage power supply even during a transition from a mode for output of a high boosted voltage to a mode for output of a low boosted voltage, during a restart after an instantaneous power interruption or the like.

To attain the object described above, according to the present invention, the gate voltage of a charge-transfer transistor is forcibly reset to a predetermined reset potential of which the absolute value is higher than the supply voltage.

The booster circuit of the present invention includes n-stage (n is an integer equal to or more than 2) booster cells connected in series, at least the final-stage booster cell among the n booster cells including: a charge-transfer transistor for transferring an output voltage received from the preceding stage to the following stage; an output voltage boost capacitor having one electrode connected to the output of the charge-transfer transistor and the other electrode receiving a first clock signal having a predetermined phase; a gate voltage boost capacitor having one electrode connected to the gate of the charge-transfer transistor and the other electrode receiving a second clock signal having a predetermined phase; and a switching transistor for connecting the gate of the charge-transfer transistor to the input terminal of the charge-transfer transistor, wherein the booster circuit includes reset means for receiving a control signal and resetting a gate voltage of the charge-transfer transistor of at least the final-stage booster cell to a predetermined reset potential based on the control signal, the absolute value of the predetermined reset potential being higher than the supply voltage.

In the booster circuit described above, preferably, the control signal is output in an event that the gate voltage of the charge-transfer transistor of at least the final-stage booster cell remains higher than an input voltage of the charge-transfer transistor by a value equal to or greater than a predetermined voltage, and in this event, the reset means resets the gate voltage of the charge-transfer transistor of at least the final-stage booster cell to the predetermined reset potential.

In the booster circuit described above, preferably, the control signal is output in an event that the gate voltage of the charge-transfer transistor of at least the final-stage booster cell remains higher than the input voltage and an output voltage of the charge-transfer transistor by a value equal to or greater than a predetermined voltage.

Preferably, the predetermined voltage is a voltage equal to a threshold voltage of the charge-transfer transistor.

In the booster circuit described above, preferably, the control signal is output to the reset means during a specific mode transition, and during the specific mode transition, the reset means resets the gate voltage of the charge-transfer transistor of at least the final-stage booster cell to a predetermined reset potential.

In the booster circuit described above, preferably, the control signal is output to the reset means during a startup of the booster circuit, and during the startup, the reset means resets the gate voltage of the charge-transfer transistor of at least the final-stage booster cell to a predetermined reset potential.

In the booster circuit described above, preferably, the predetermined reset potential for the gate voltage of the charge-transfer transistor is set at a voltage value higher than the supply voltage when positive-going boost operation is performed.

In the booster circuit described above, preferably, the resetting of the gate voltage of the charge-transfer transistor to a predetermined reset potential by the reset means is performed for a plurality of booster cells, and the predetermined reset potential for the gate voltage of the charge-transfer transistor of one of the plurality of booster cells is set at a potential equal to or higher than the predetermined reset potential for the preceding-stage booster cell when positive-going boost operation is performed.

In the booster circuit described above, preferably, the reset means includes: boost means for receiving the control signal, amplifying the amplitude of the control signal, and outputting the amplified signal; and a reset circuit for receiving the output of the boost means and resetting the gate voltage of the charge-transfer transistor of at least the final-stage booster cell to a predetermined reset potential exceeding the supply voltage.

In the booster circuit described above, preferably, the reset means resets the gate voltage of the charge-transfer transistor of at least the final-stage booster cell to a predetermined reset potential equal to a voltage input to the charge-transfer transistor.

Preferably, the booster circuit described above further includes control signal generation means for receiving a predetermined control signal originally generated for control of the booster circuit, detecting a change of the predetermined control signal, asserting the control signal for a set time period, and outputting the control signal to the reset means.

Alternatively, the booster circuit of the present invention includes n-stage (n is an integer equal to or more than 2) booster cells connected in series, at least the final-stage booster cell among the n booster cells including: a charge-transfer transistor for transferring an output voltage received from the preceding stage to the following stage; an output voltage boost capacitor having one electrode connected to the output of the charge-transfer transistor and the other electrode receiving a first clock signal having a predetermined phase; a gate voltage boost capacitor having one electrode connected to the gate of the charge-transfer transistor and the other electrode receiving a second clock signal having a predetermined phase; and a switching transistor for connecting the gate of the charge-transfer transistor to the input terminal of the charge-transfer transistor, wherein the booster circuit includes automatic reset means for resetting a gate voltage of the charge-transfer transistor to a predetermined reset potential when the voltage difference between the gate voltage and an input voltage of the charge-transfer transistor is greater than a predetermined potential difference.

In the booster circuit described above, preferably, the automatic reset means includes: switch means for connecting the gate of the charge-transfer transistor to the input terminal of the charge-transfer transistor; and a control circuit for comparing the gate voltage and the input voltage of the charge-transfer transistor to obtain a voltage difference, activating the switch means when the voltage difference is greater than a predetermined potential difference, to connect the gate of the charge-transfer transistor to the input terminal of the charge-transfer transistor.

In the booster circuit described above, the booster circuit preferably performs negative-going boost operation.

Conventionally, in an event that the output voltage of the booster circuit abruptly changes from a high boosted voltage to a low boosted voltage, such as during a mode transition or during an instantaneous power interruption, under use of a low-voltage power supply, the following problem may occur. That is, the switching transistor remains in the cut-off state, and thus the gate of the charge-transfer transistor is left at a high potential. Therefore, the potential difference between the gate voltage and the input voltage of the charge-transfer transistor becomes equal to or greater than the threshold voltage of the charge-transfer transistor, and as a result, the charge-transfer transistor remains in the ON state. However, according to the present invention, the control signal is sent to the reset means after the mode transition or during the restart, to forcibly reset the gate voltage of the charge-transfer transistor to a predetermined reset potential of which the absolute value is higher than the supply voltage. Therefore, the problem that the charge-transfer transistor remains in the ON state is prevented, and normal boost operation is secured after a mode transition or during a restart. Thus, stable current supply capability is ensured, and a highly reliable booster circuit is attained.

According to the present invention, in particular, in the positive booster circuit for boosting a positive voltage, the reset potential for the gate voltage of the charge-transfer transistor is set at a positive voltage higher than the positive supply voltage. Therefore, waste of the positive boosted charge due to the reset operation can be suppressed, and the time required to reach the steady state of the boost operation can be shortened. Thus, reduction of power consumption and shortening of the wait time until voltage stability can be attained.

According to the present invention, in particular, the reset potential for the gate voltage of the charge-transfer transistor of a booster cell is set at a potential equal to or higher than the reset potential set for the preceding-stage booster cell. Therefore, waste of the boosted charge due to the reset operation can be further suppressed, and the time required to reach the steady state of the boost operation can be further shortened. Thus, further reduction of power consumption and further shortening of the wait time until voltage stability can be attained.

According to the present invention, in particular, the reset potential for the gate voltage of the charge-transfer transistor is set at a potential equal to or higher than the supply voltage. Therefore, the charge remaining at the gate of the charge-transfer transistor is returned to the supply terminal during the reset operation. This further decreases the current consumption.

According to the present invention, in particular, the reset potential for the gate voltage of the charge-transfer transistor is equal to the input voltage of the same charge-transfer transistor. Therefore, waste of the boosted charge due to the reset operation can be minimized, and the time required to reach the steady state of the boost operation can be most shortened. Thus, reduction of power consumption and shortening of the wait time until voltage stability can be attained effectively.

According to the present invention, in particular, the reset operation for the gate is voltage of the charge-transfer transistor can be performed using the existing control signal. This enables the reset operation with a simple circuit configuration.

According to the present invention, in particular, the automatic reset means automatically operates when the voltage difference between the gate voltage and the input voltage of the charge-transfer transistor is greater than a predetermined value, to automatically reset the gate voltage of the charge-transfer transistor to the input voltage of the transistor. Therefore, even in an event of abrupt change of the output voltage from a high boosted voltage to a low boosted voltage, such as during a mode transition or during an instantaneous power interruption of the booster circuit, it is possible to prevent reliably the problem of the charge-transfer transistor remaining in the ON state that would otherwise be likely to occur in such an event. In addition, waste of the boosted charge due to the reset operation is suppressed. Normal boost operation is therefore secured with low power consumption even after the mode transition or during the restart. Thus, stable current supply capability is ensured, and a highly reliable booster circuit is attained.

According to the present invention, in particular, in negative-going boost operation, during abrupt change of the output voltage from a high negative boosted voltage to a low negative boosted voltage, such as during a mode transition or during an instantaneous power interruption, the problem that the charge-transfer transistor remains in the ON state is prevented. Thus, normal boost operation is secured after the mode transition and during the restart.

DESCRIPTION OF THE PREFERRED EMBODIMENTS

Hereinafter, preferred embodiments of the present invention will be described with reference to the accompanying drawings.

Embodiment 1

Figure 1:
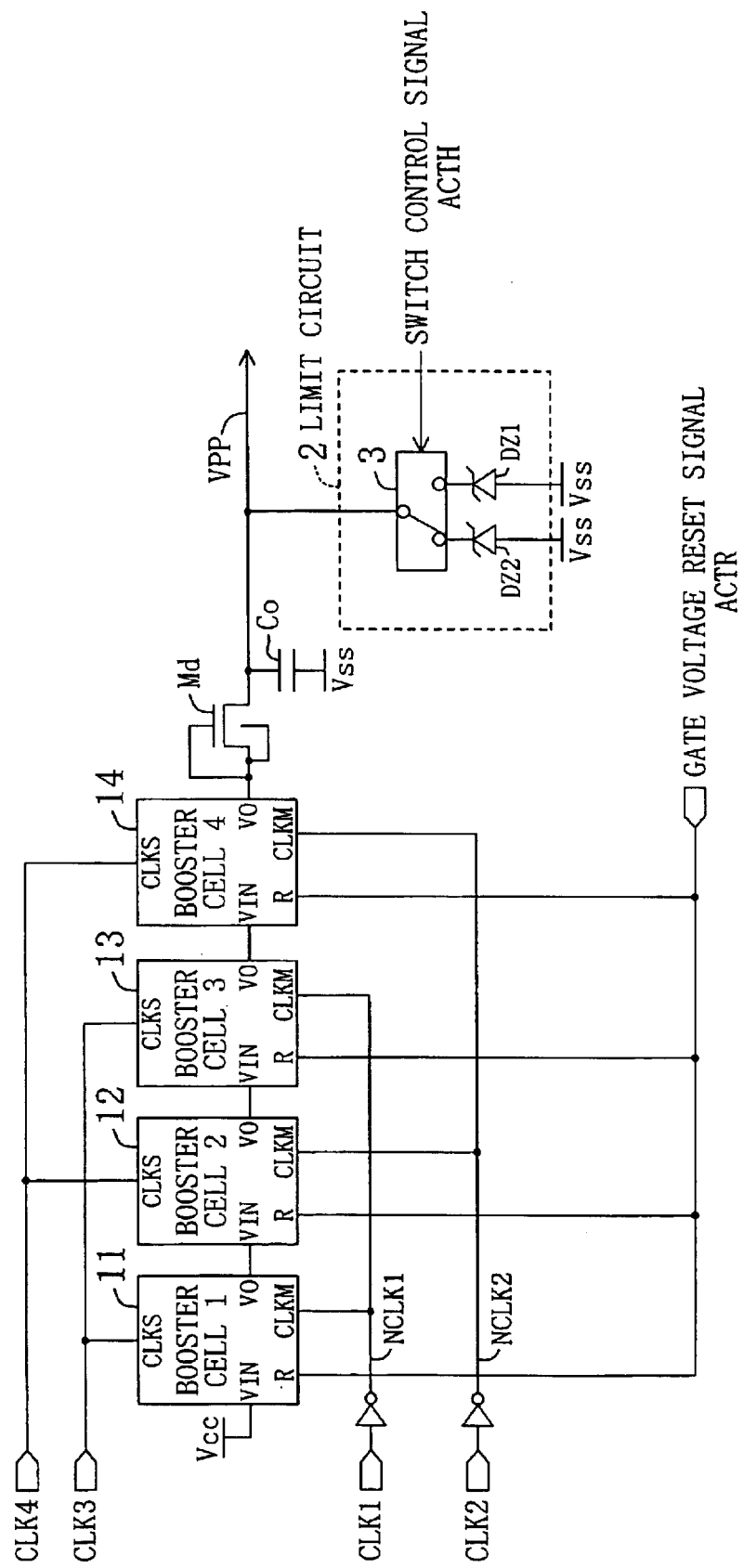
FIG. 1 is a block diagram of a booster circuit of Embodiment 1 of the present invention.
Figure 22:
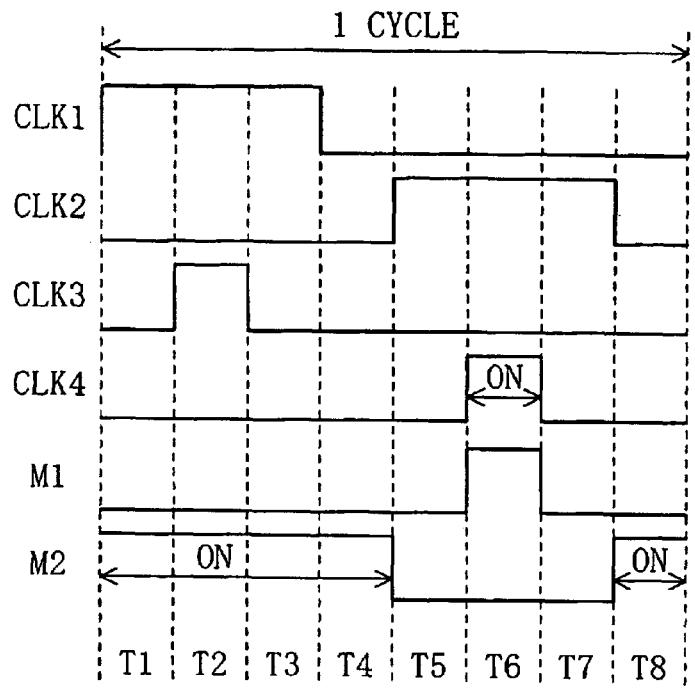
FIG. 22 is a timing chart of boost clock signals for driving the booster circuit.

FIG. 1 shows a configuration of a threshold-offset type booster circuit of Embodiment 1 of the present invention. The booster circuit of FIG. 1 includes four-stage booster cells 11 to 14 connected in series, a rectifying transistor Md connected to the output of the final-stage (fourth-stage) booster cell 14, and a limit circuit 2 and a smoothing capacitor Co connected to the output of the rectifying transistor Md. The limit circuit 2 is essentially composed of a read Zener diode DZ1 having a breakdown voltage of 5V used for read operation, a rewrite Zener diode DZ2 having a breakdown voltage of 10V used for write/erase operations, and a switch 3. The switch 3 switches between the read Zener diode DZ1 and the rewrite Zener diode DZ2 according to a switch control signal ACTH. Each of the booster cells 11 to 14 is driven with two boost clock signals having different phases (CLK1 and CLK3 or CLK2 and CLK4) as shown in FIG. 22. The clock signals CKL1 to CKL4 are square waves having predetermined "H" and "L" durations and cycles.

Figure 2:
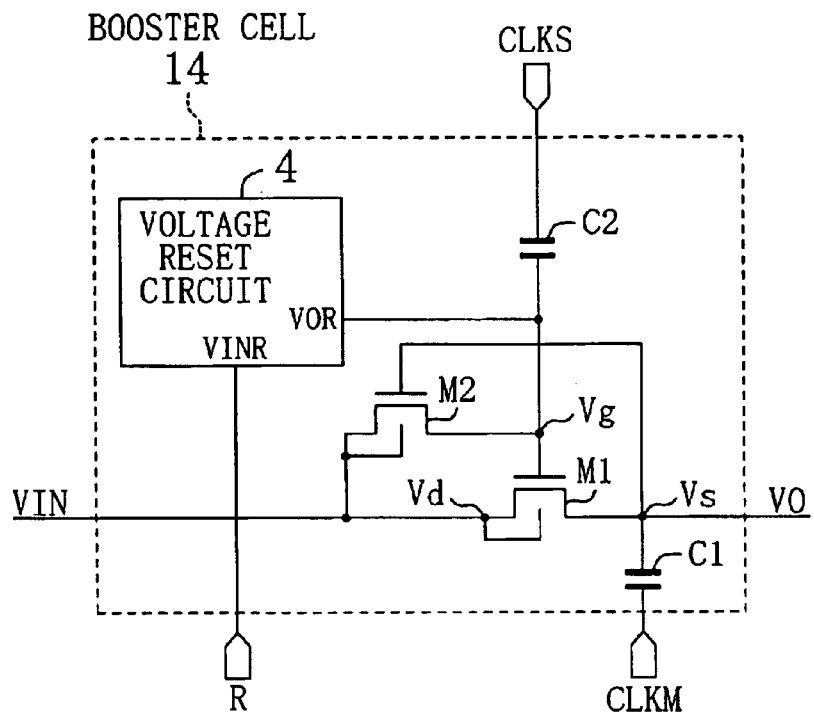
FIG. 2 is a circuit diagram of a booster cell of the booster circuit of Embodiment 1.

One feature of this embodiment is that a gate voltage reset signal ACTR is input to reset terminals R of the booster cells 11 to 14. The booster cells 11 to 14 are identical in configuration to each other. FIG. 2 shows an internal configuration of the final-stage booster cell 14 as an example, which will be described as follows.

Referring to FIG. 2, the booster cell 14 includes an N-channel charge-transfer transistor M1, an N-channel switching transistor M2, an output voltage boost capacitor C1 and a gate voltage boost capacitor C2. The charge-transfer transistor M1 receives an output voltage from the preceding-stage booster cell 13 and transfers the voltage to the following stage (that is, the rectifying transistor Md). One electrode of the output voltage boost capacitor C1 is connected to the output (source electrode) of the charge-transfer transistor M1, whole the other electrode thereof is connected to a clock terminal CLKM to receive an inverted signal (first clock signal) NCLK2 of the clock signal CLK2. One electrode of the gate voltage boost capacitor C2 is connected to the gate electrode of the charge-transfer transistor M1, while the other electrode thereof is connected to a clock terminal CLKS to receive the clock signal (second clock signal) CLK4. The switching transistor M2 is connected to the gate terminal and the input terminal (drain terminal connected to an input terminal VIN of the booster cell 14) of the charge-transfer transistor M1, and serves to establish the same potential between the gate voltage and the voltage at the input terminal of the charge-transfer transistor M1 when it is in the ON state. As described before, the final-stage booster cell 14 receives the clock signals CLK4 at one clock terminal CLKS, the inverted signal NCLK2 of the clock signal CLK2 at the other clock terminal CLKM, and a boosted voltage from the preceding-stage booster cell 13 at the input terminal VIN, and outputs a boosted voltage from an output terminal VO to the rectifying transistor Md. The configuration described so far is the same as that of the conventional booster cell shown in FIG. 23.

The feature of the booster cells 11 to 14 of this embodiment is that a voltage reset circuit (reset means) 4 is provided for each of the booster cells as shown in FIG. 2. The voltage reset circuit 4 includes an input terminal VINR connected to the reset terminal R of the booster cell 14 and an output terminal VOR connected between the charge-transfer transistor M1 and the gate voltage boost capacitor C2.

Figure 3:
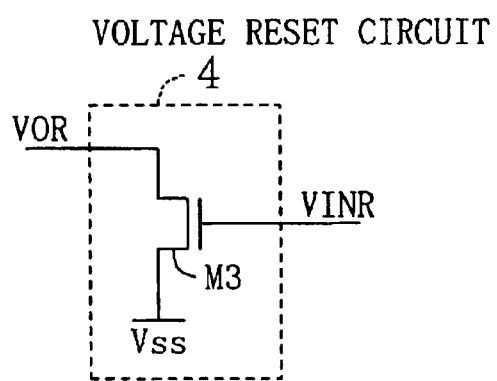
FIG. 3 is a circuit diagram of an example of a voltage reset circuit of the booster cell of FIG. 2.

FIG. 3 shows an example of internal configuration of the voltage reset circuit 4, which is essentially composed of one N-channel MOS transistor M3. The source terminal of the transistor M3 is grounded (potential Vss), the drain terminal is connected to the output terminal VOR, and the gate terminal receives the gate voltage reset signal ACTR via the input terminal VINR. The gate voltage reset signal (control signal) ACTR is asserted when, in the relationship among the gate voltage, input voltage and output voltage of the charge-transfer transistor M1, the gate voltage of the charge-transfer transistor M1 remains higher than the input voltage by a value equal to or greater than a predetermined voltage (for example, the threshold voltage of the charge-transfer transistor M1), or the gate voltage of the charge-transfer transistor M1 remains higher than the input voltage and the output voltage by a value equal to or greater than the predetermined voltage, turning ON the charge-transfer transistor M1, such as during a specific mode transition including transition from the data rewrite mode to the read mode and transition from the rewrite mode to the program verify mode, and during a restart after an instantaneous power interruption. Therefore, in the voltage reset circuit 4, when the gate voltage reset signal ACTR is asserted during a specific mode transition or during a restart, the transistor M3 is turned ON, forcibly drawing charge existing at the gate electrode of the charge-transfer transistor M1 to the ground and thus resetting the gate potential Vg of the charge-transfer transistor M1 to a predetermined reset potential equal to the ground potential Vss.

In this embodiment, the charge-transfer transistor M1 and the switching transistor M2 of each of the booster cells 11 to 14 are configured so that the substrate is connected to the drain. Alternatively, the substrate may be connected to the ground terminal. The booster cells 11 to 14 are not necessarily identical in the sizes of the charge-transfer transistor M1, the switching transistor M2 and the boost capacitors C1 and C2 constituting the booster cell.

The operation of the booster circuit of this embodiment having the configuration described above will be described with reference to FIG. 4.

Figure 4:
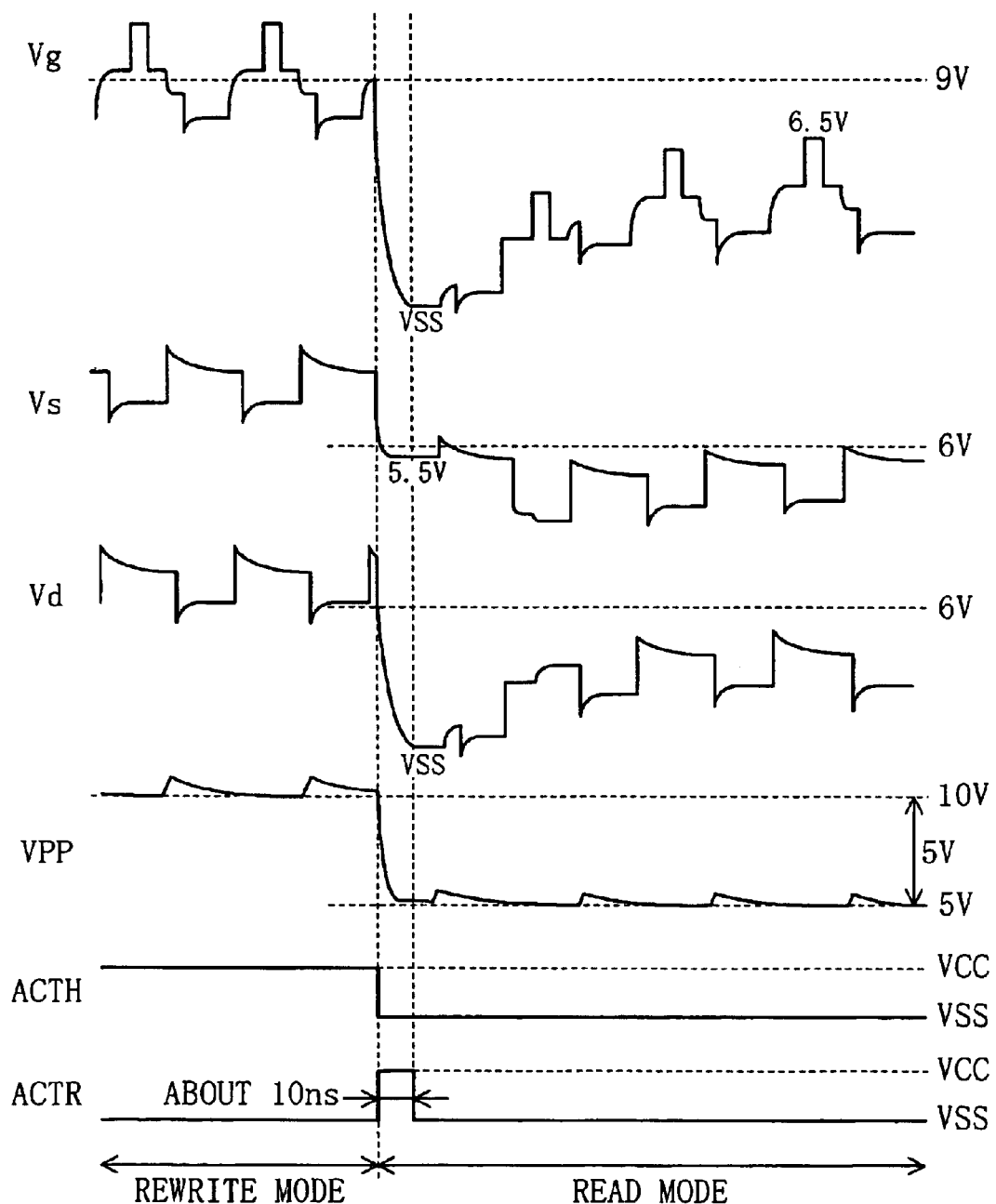
FIG. 4 is a timing chart demonstrating the operation of the booster circuit of Embodiment 1.

Referring to FIG. 4, consider the switch control signal ACTH changes from "H" to "L", indicating abrupt transition from the rewrite operation mode for output of a high voltage to the read operation mode for output of a low boosted voltage, for example. In this case, the source voltage Vs and the drain voltage Vd of the charge-transfer transistor M1 of the fourth-stage booster cell 14 abruptly decrease, becoming roughly an identical potential. This may cause the switching transistor M2 remaining in the cut-off state irrespective of changes of the boost clock signals CLK2 and CLK4, and thus the gate voltage Vg of the charge-transfer transistor M1 may be left high.

However, at the time of the abrupt transition, the gate voltage reset signal ACTR is put in the active ("H") state from the inactive ("L") state for only a set time period (for example, 10 ns). During this set time period (10 ns), the gate-source voltage (supply voltage Vcc (for example, 2.5 V)) of the NMOS transistor M3 constituting the voltage reset circuit 4 exceeds the threshold voltage Vt (for example, 0.51 V) of the NMOS transistor. The NMOS transistor M3 is therefore turned ON. This forcibly resets the gate voltage Vg of the charge-transfer transistor M1 of each of the booster cells 11 to 14 to the ground potential Vss, to thereby prevent the charge-transfer transistor M1 from remaining in the ON state.

After the reset operation, the gate voltage reset signal ACTR is returned to the inactive ("L") state from the active ("H") state. This turns OFF the NMOS transistor M3. Thereafter, as the gate voltage of the charge-transfer transistor M1 is gradually boosted during the read operation mode after the mode transition, the boosted charge will not be lost, and thus normal boost operation is secured.

As described above, in this embodiment, when the boosted voltage abruptly changes from a high voltage to a low voltage, such as during a specific mode transition or during a restart after an instantaneous power interruption, the gate potential of the charge-transfer transistor M1 is forcibly reset to the ground potential Vss with the voltage reset circuit 4. This prevents the problem in the boost operation that the charge-transfer transistor M1 remains in the ON state, and ensures stable current supply capability after the specific mode transition or after the restart. Thus, a highly reliable booster circuit can be attained.

In this embodiment, the voltage reset circuit 4 was provided for all the booster cells 11 to 14 for resetting the gate potential Vg of the charge-transfer transistor M1 in each stage to the ground potential Vss. Alternatively, the resetting of the gate voltage Vg of the charge-transfer transistor M1 may be adopted for only part of the booster cells including the final-stage booster cell, as required. In this case, since the boosted charge amount to be drawn simultaneously decreases, the boosted charge is less wasted and thus power consumption can be reduced. In addition, since the number of voltage reset circuits 4 decreases, reduction in area is possible.

In this embodiment, the voltage reset circuit 4 was placed inside each of the booster cells 11 to 14. Alternatively, it may be placed outside the booster cell.

Embodiment 2

Figure 5:
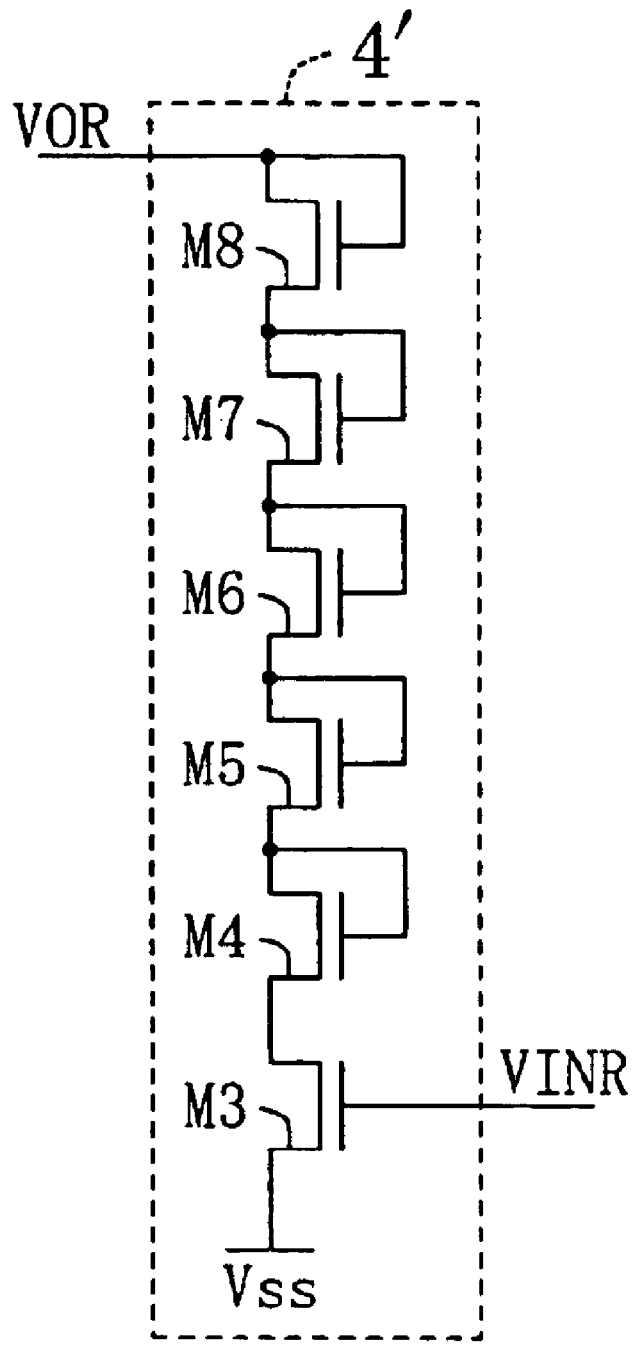
FIG. 5 is a circuit diagram of an example of a voltage reset circuit for a booster circuit of Embodiment 2 of the present invention.

FIG. 5 shows a configuration of a voltage reset circuit provided for each booster cell of a booster circuit of Embodiment 2 of the present invention. The entire configuration of the booster circuit of this embodiment is the same as that shown in FIG. 1, and the internal configuration of the booster cell in each stage of the booster circuit is the same as that shown in FIG. 2. Illustration and description thereof are therefore omitted here.

The feature of this embodiment is that the reset potential for the gate voltage of the charge-transfer transistor M1 of each of the booster cells 11 to 14 is set at a value higher than the supply voltage. As shown in FIG. 5, in the voltage reset circuit of this embodiment, denoted by 4', an NMOS transistor M3 of which the gate terminal is connected to an input terminal VINR for receiving the gate voltage reset signal ACTR is connected in series with five diode-connected NMOS transistors M4 to M8, and the drain terminal of the diode-connected NMOS transistor M8 is connected to the gate terminal of the charge-transfer transistor M1 via an output terminal VOR.

With the configuration described above, when the gate voltage reset signal ACTR is put in the active ("H") state from the inactive ("L") state for only a set time period (10 ns) during a specific mode transition or during a restart after an instantaneous power interruption, the gate-source voltage (supply voltage Vcc) of the NMOS transistor M3 of the voltage reset circuit 4' exceeds the threshold voltage (0.51 V) of the NMOS transistor, turning ON the NMOS transistor M3.

The gate terminal of the charge-transfer transistor M1 of each of the booster cells 11 to 14 is grounded via the five diode-connected NMOS transistors M4 to M8 of the voltage reset circuit 4'. Therefore, assuming that the threshold voltage Vtd of the five NMOS transistors M4 to M8 is 0.51 V and the supply voltage Vcc is 2.5 V, the gate voltage Vg of the charge-transfer transistor M1 is reset to a predetermined reset potential equal to a voltage value (5×Vtd=5×0.51 V=2.55 V) that is higher than the supply voltage Vcc (2.5 V).

Accordingly, in this embodiment, as in Embodiment 1, it is possible to prevent the problem in the boost operation that the charge-transfer transistor M1 of each of the booster cells 11 to 14 remains in the ON state, ensure stable current supply capability after a specific mode transition or after a restart, and thus attain a highly reliable booster circuit. In addition, in this embodiment, in which the reset potential for the gate voltage of the charge-transfer transistor M1 is set at a value higher than the supply voltage, it is possible to minimize waste of the boosted charge due to the reset operation for the gate voltage, and also shorten the time required to reach the steady state of the boost operation. Thus, reduction of power consumption and shortening of the wait time until voltage stability can be attained.

In this embodiment, the gate voltage Vg of the charge-transfer transistor M1 was reset to a value higher than the supply voltage Vcc for the booster cells 11 to 14 in all stages. Alternatively, the resetting of the gate voltage Vg of the charge-transfer transistor M1 may be adopted for only part of the booster cells including the final-stage booster cell, as required, as in Embodiment 1.

Naturally, the predetermined reset potential for the gate voltage of the charge-transfer transistor M1 may be considerably higher than the supply voltage Vcc as long as the reset operation is effective. By resetting to such a high voltage, the effects of minimizing waste of the boosted charge due to the reset operation for the gate voltage and shortening the time required to reach the steady state of the boost operation are remarkable.

Embodiment 3

Figure 6:
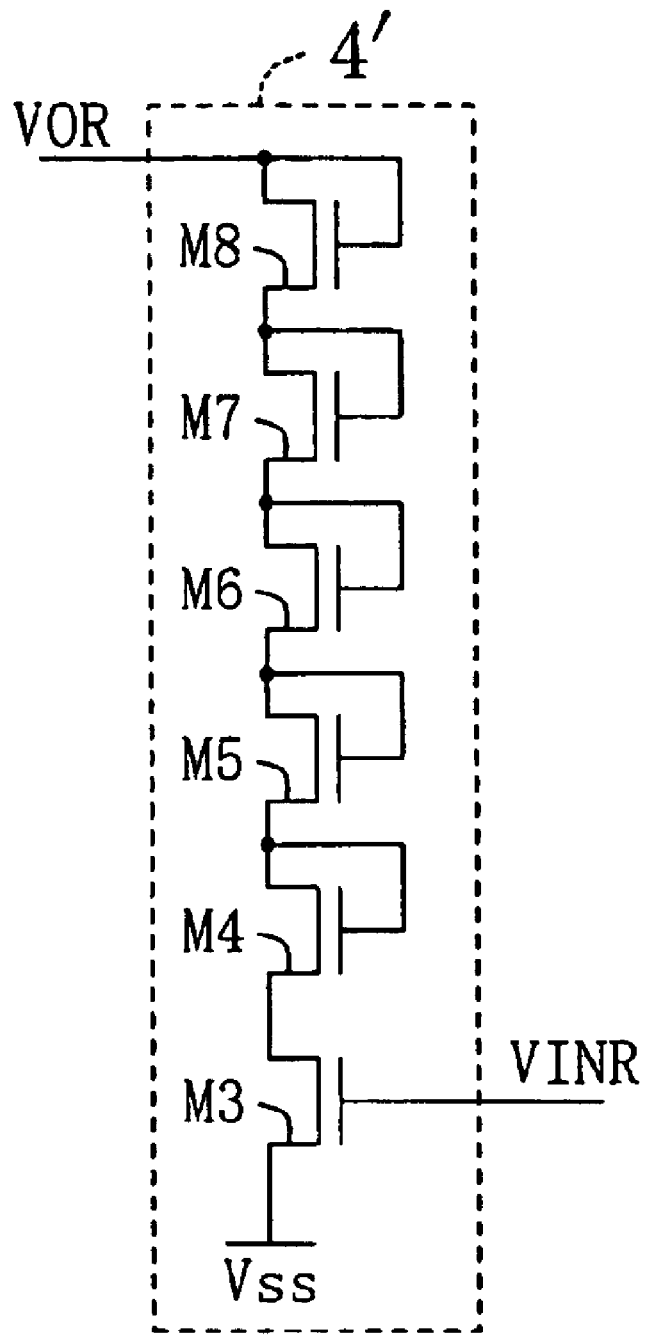
FIG. 6 is a circuit diagram of an example of a voltage reset circuit in the first and second stages for a booster circuit of Embodiment 3 of the present invention.
Figure 7:
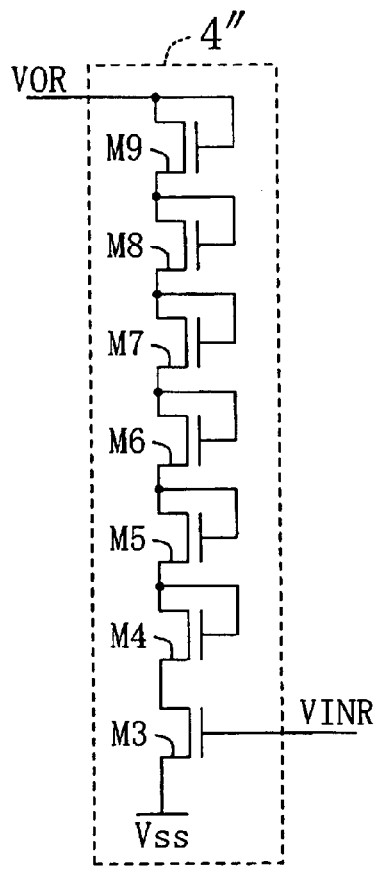
FIG. 7 is a circuit diagram of an example of a voltage reset circuit in the third and fourth stages for the booster cell of Embodiment 3.

In Embodiment 3, a voltage reset circuit is provided for the booster cell in each stage, as in Embodiments 1 and 2. In this embodiment, however, the reset potential for the gate voltage Vg of the charge-transfer transistor M1 of the booster cell is set individually for each stage. The entire configuration of the booster circuit and the internal configuration of each booster cell in this embodiment are the same as those shown in FIGS. 1 and 2, respectively. FIGS. 6 and 7 show internal configurations of voltage reset circuits 4' and 4" used in this embodiment.

The voltage reset circuit 4' of FIG. 6 is used for the first-stage and second-stage booster cells 11 and 12, which has the same circuit configuration as the voltage reset circuit 4' of FIG. 5 described in the previous embodiment.

The voltage reset circuit 4" of FIG. 7 is used for the third-stage and fourth-stage booster cells 13 and 14, and has a larger number of diode-connected NMOS transistors. That is, the voltage reset circuit 4" has six diode-connected NMOS transistors M4 to M9, including one added to the NMOS transistors M4 to M8 shown in FIG. 6. The added NMOS transistor M9 has the same threshold voltage Vth (0.51 V) as the other five NMOS transistors M4 to M8.

With the configuration described above, when the gate voltage reset signal ACTR is put in the active ("H") state during a specific mode transition or during a restart after an instantaneous power interruption, the NMOS transistor M3 of the voltage reset circuit 4' is turned ON in the first-stage and second-stage booster cells 11 and 12. In this state, as described above, the gate voltage of the charge-transfer transistors M1 of the first-stage and second-stage booster cells 11 and 12 is reset to a predetermined reset potential equal to a voltage value (5×Vtd=5×0.51 V=2.55 V) that is higher than the supply voltage Vcc. The NMOS transistor M3 of the voltage reset circuit 4" is also turned ON in the third-stage and fourth-stage booster cells 13 and 14. In this state, the gate voltage of the charge-transfer transistors M1 of the third-stage and fourth-stage booster cells 13 and 14 is reset to a predetermined reset potential equal to a voltage value (6×Vtd=6×0.51 V=3.06 V), which is yet higher than the voltage value (2.55 V) that is higher than the supply voltage Vcc.

As described above, in this embodiment, the reset potential for the gate voltage of the charge-transfer transistor M1 is set at the voltage value (2.55 V) higher than the supply voltage (2.5 V) in the first-stage and second-stage booster cells 11 and 12, and set at the yet higher voltage value (3.06 V) in the third-stage and fourth-stage booster cells 13 and 14. Therefore, in this embodiment, in addition to the functions and effects obtained in Embodiments 1 and 2, the following advantage is attained. That is, considering the fact that the boosted voltage in the booster cells 11 to 14 is higher as the stage is later, an identical or higher voltage value is set as the reset potential for the gate voltage of the charge-transfer transistor M1 as the stage is later. Therefore, waste of the boosted charge due to the reset operation can be further prevented, and the time required to reach the steady state of the boost operation can be further shortened, compared with the Embodiments 1 and 2.

In this embodiment, the gate voltage Vg of the charge-transfer transistor M1 was reset to a predetermined reset voltage for all the booster cells 11 to 14. Alternatively, this resetting may be adopted for only some booster cells including the final-stage booster cell, as required, as in the previous embodiments.

Embodiment 4

Figure 8:
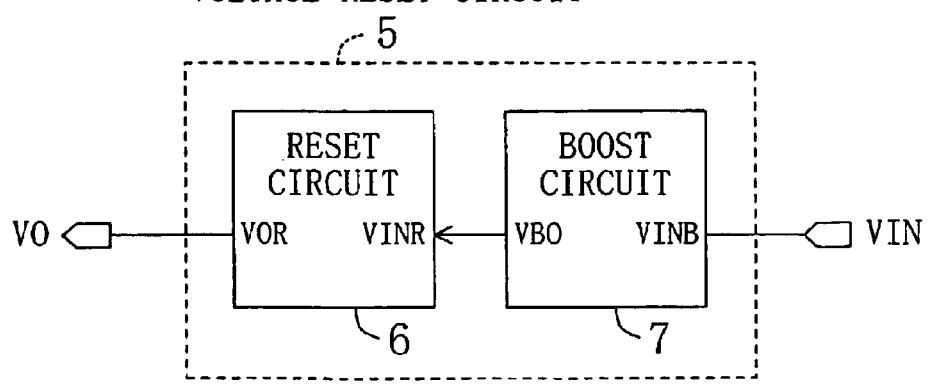
FIG. 8 is a block diagram of an example of a voltage reset circuit for a booster circuit of Embodiment 4 of the present invention.
Figure 9:
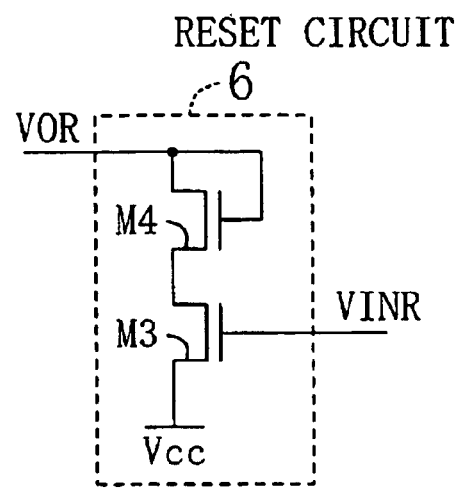
FIG. 9 is a circuit diagram of an example of a reset circuit of the voltage reset circuit of FIG. 8.
Figure 10:
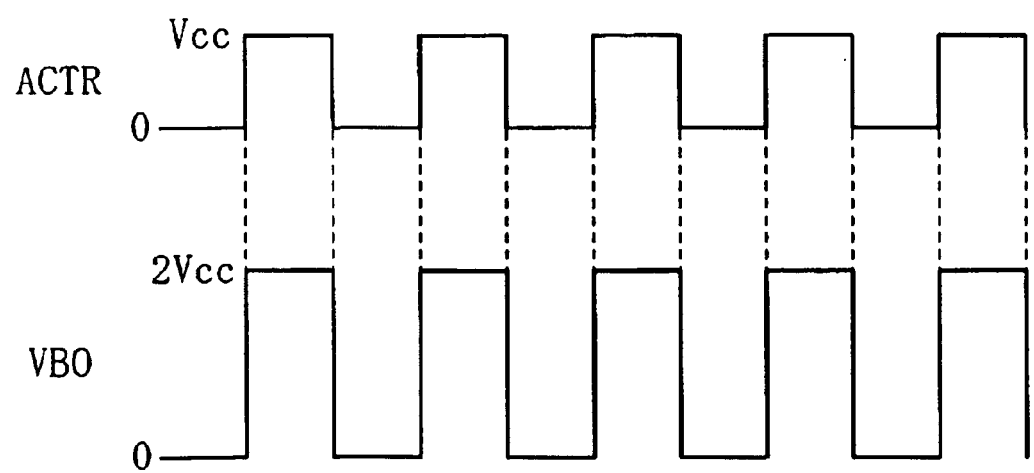
FIG. 10 is a timing chart of input/output signals for a boost circuit of the voltage reset circuit of FIG. 8.

Embodiment 4 of the present invention will be described with reference to FIGS. 8 to 10. In this embodiment, the charge at the gate of the charge-transfer transistor M1 is returned to the power supply during resetting of the gate potential. The entire configuration of the booster circuit and the internal configuration of each booster cell in this embodiment are the same as those in FIGS. 1 and 2, respectively. FIG. 8 shows an internal configuration of a voltage reset circuit 5 of this embodiment.

The voltage reset circuit 5 of FIG. 8, for resetting the gate voltage Vg of the charge-transfer transistor M1 to a predetermined reset potential higher than the supply voltage Vcc, includes a boost circuit 7 and a reset circuit 6. The boost circuit 7 amplifies double the amplitude of the gate voltage reset signal ACTR input at an input terminal VINB as shown in FIG. 10, and outputs the amplified signal from an output terminal VBO. The reset circuit 6 receives the double-amplified gate voltage reset signal from the boost circuit 7. As shown in FIG. 9, the reset circuit 6 is essentially composed of an NMOS transistor M3 and one diode-connected NMOS transistor M4 connected in series. The gate terminal of the NMOS transistor M3 receives the amplified gate voltage reset signal from the boost circuit 7 via an input terminal VINR. The threshold voltage Vtd of the diode-connected NMOS transistor M4 is 0.51 V, for example. The drain terminal of the diode-connected NMOS transistor M4 is connected to the gate terminal of the charge-transfer transistor M1, and the source terminal of the NMOS transistor M3 is connected to the supply terminal (Vcc). The voltage reset circuit 5 having the above configuration is provided for each of the booster cells 11 to 14.

In this embodiment, when the gate voltage reset signal ACTR is put in the active ("H") state from the inactive ("L") state for a set time period (10 ns), the amplitude of the gate voltage reset signal ACTR is amplified double by the boost circuit 7, and the amplified reset signal is input to the gate of the NMOS transistor M3 of the reset circuit 6 during this set time period. As a result, the gate-source voltage of the transistor M3 becomes equal to the supply voltage Vcc (2×Vcc−Vcc=Vcc=2.5 V), which exceeds the threshold voltage (0.51 V). This turns ON the NMOS transistor M3, and thus the gate voltage Vg of the charge-transfer transistor M1 of each of the booster cells 11 to 14 is reset to a reset potential equal to a voltage value (Vcc+Vtd=2.5 V+0.51 V=3.01 V) that is slightly higher than the supply voltage Vcc.

Accordingly, in this embodiment, it is possible to prevent the problem in the boost operation that the charge-transfer transistor M1 remains in the ON state. Moreover, the boosted charge existing at the gate of the charge-transfer transistor M1 of each of the booster cells 11 to 14 is returned to the supply voltage terminal Vcc during the resetting of the gate potential. This can reduce current consumption.

In this embodiment, the gate voltage Vg of the charge-transfer transistor M1 was reset to a voltage value (Vcc+Vtd=2.5 V+0.51 V=3.01 V) that is slightly higher than the supply voltage for all the booster cells 11 to 14. Alternatively, the resetting of the gate voltage Vg of the charge-transfer transistor M1 may be made for part of the booster cells, as required. In this case, by decreasing the boosted charge amount to be drawn simultaneously, the boosted charge is less wasted and thus power consumption can be reduced. In addition, since the number of the NMOS transistors M3 and M4 of the reset circuits 6 and the boost circuits 7 can be reduced, reduction in area is possible.

In this embodiment, the boost circuit 7 was provided for the voltage reset circuit 5 of each of the booster cells 11 to 14. Alternatively, one booster circuit 7 may be shared by all the voltage reset circuits 5. This enables further reduction in area.

Embodiment 5

Figure 11:
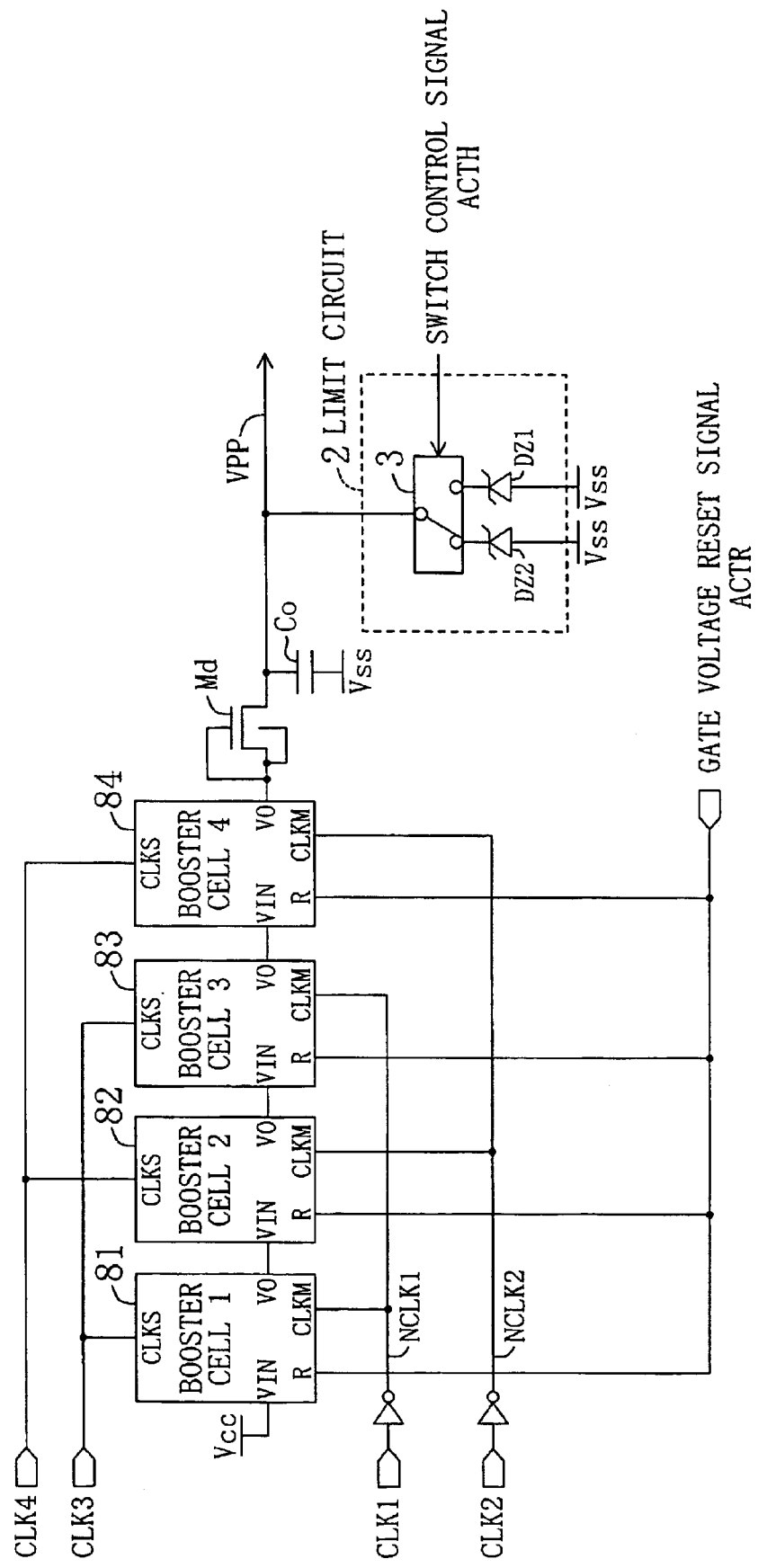
FIG. 11 is a block diagram of a booster circuit of Embodiment 5 of the present invention.
Figure 12:
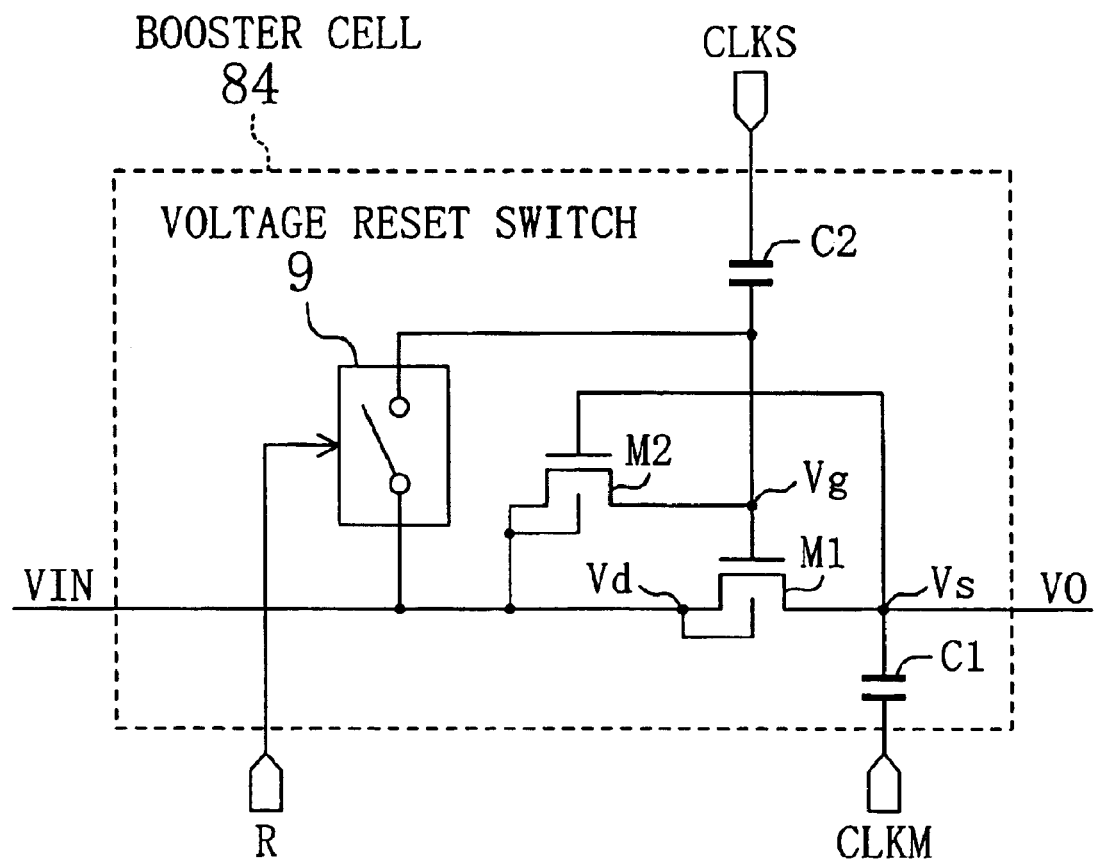
FIG. 12 is a circuit diagram of a booster cell of the booster circuit of Embodiment 5.

FIGS. 11 and 12 show a booster circuit of Embodiment 5 of the present invention. In this embodiment, the predetermined reset potential for the gate voltage Vg of the charge-transfer transistor M1 is set at a boosted voltage input to the charge-transfer transistor M1.

The booster circuit of FIG. 11 includes booster cells 81 to 84 identical in configuration to each other. As shown in FIG. 12, each of the booster cells has a voltage reset switch 9. The voltage reset switch 9 is connected to both the gate terminal and the input terminal (drain terminal) of the charge-transfer transistor M1 of each of the booster cells 81 to 84, and receives the gate voltage reset signal ACTR via a reset terminal R. When the gate voltage reset signal ACTR is active, the voltage reset switch 9 connects the gate terminal with the input terminal (drain terminal) of the charge-transfer transistor M1, to allow the gate potential Vg of the charge-transfer transistor M1 to be reset to a reset potential equal to the drain potential Vd.

With the configuration described above, during a specific mode transition or during a restart after an instantaneous power interruption, the gate voltage reset signal ACTR is put in the active ("H") state for a set time period, and this turns ON the voltage reset switch 9 of each of the booster cells 81 to 84. As a result, the gate potential Vg of the charge-transfer transistor M1 of each of the booster cells 81 to 84 is reset to a predetermined reset potential that is equal to the drain potential of the transistor (that is, the boosted voltage input to the charge-transfer transistor M1 from the preceding-stage booster cell).

Accordingly, in this embodiment, in which the gate potential Vg of the charge-transfer transistor M1 is forcibly reset to the drain potential Vd with the voltage reset switch 9 during a specific mode transition or during a restart after an instantaneous power interruption, it is possible to prevent the problem in the boost operation that the charge-transfer transistor M1 remains in the ON state, and thus normal boost operation is secured. It is also possible to minimize waste of the boosted charge due to the reset operation, and most shorten the time required to reach the steady state of the boost operation. Thus, reduction of power consumption and shortening of the wait time until voltage stability can be attained very effectively.

In this embodiment, the gate voltage Vg of the charge-transfer transistor M1 was reset to a potential equal to the drain voltage Vd for all the booster cells 81 to 84. Alternatively, the gate voltage Vg of the charge-transfer transistor M1 may be reset for only part of the booster cells including the final-stage booster cell, as required.

Embodiment 6

A booster circuit of Embodiment 6 of the present invention will be described with reference to FIGS. 13 to 15. The feature of this embodiment is that a mode detection circuit 10 is provided. The mode detection circuit 10 detects a change of the switch control signal ACTH from the active state to the inactive state, that is, an abrupt drop of the output voltage VPP, and automatically asserts the gate voltage reset signal ACTR only for a set time period after the detection. In this embodiment, the voltage reset switch 9 shown in FIG. 12 is provided for each of the booster cells 81 to 84 of the booster circuit shown in FIG. 13.

Figure 14:
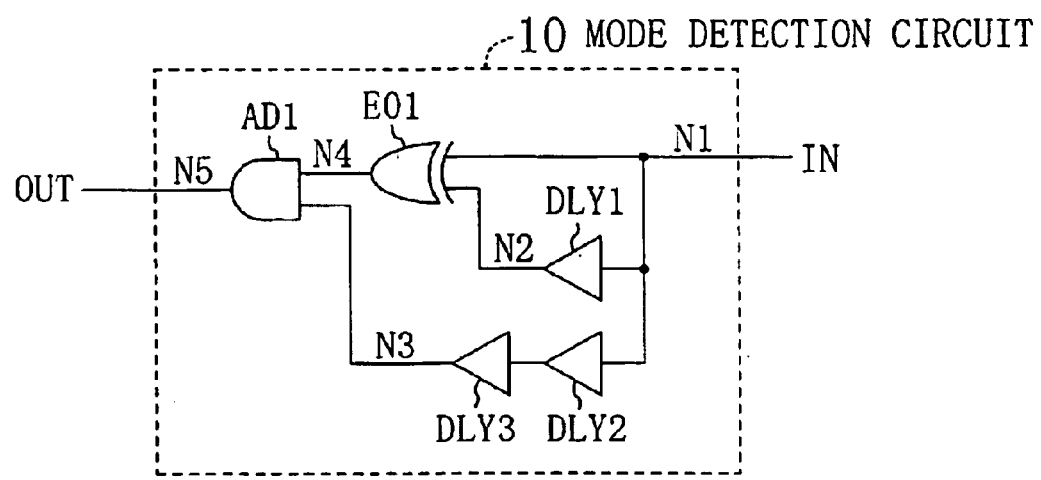
FIG. 14 is a circuit diagram of an example of a mode detection circuit of the booster circuit of Embodiment 6.
Figure 15:
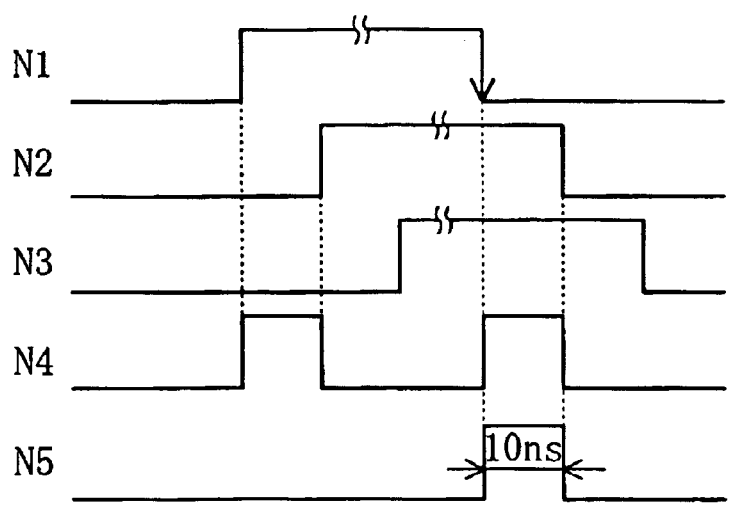
FIG. 15 is a timing chart demonstrating potential change at each node of the mode detection circuit of FIG. 14.

FIG. 14 shows an internal configuration of the mode detection circuit 10. The mode detection circuit (control signal generation means) 10 of FIG. 14 includes delay elements DLY1 to DLY3, an exclusive OR element EO1, and an AND element AD1. FIG. 15 is a timing chart showing potential changes at nodes N1 to N5 of the mode detection circuit 10. As is found from this timing chart, the mode detection circuit 10 detects only falling edges of the input switch control signal (predetermined control signal) ACTH, generates the gate voltage reset signal (control signal) ACTR that is asserted only for a set time period (for example, 10 ns) after the detection at node N5, and outputs the signal ACTR from an output terminal OUT.

Accordingly, in this embodiment, during a specific mode transition, in which the switch control signal ACTH is changed from the active state to the inactive state, the mode detection circuit 10 detects this mode transition of the switch control signal ACTH, and generates the gate voltage reset signal ACTR asserted only for a set time period (about 10 ns). During this set time period, the voltage reset switch 9 receiving the gate voltage reset signal ACTR is kept ON, allowing the gate potential Vg of the charge-transfer transistor M1 of each of the booster cells 81 to 84 to be reset to a predetermined potential equal to the drain potential of the same transistor.

In this embodiment, in particular, the gate potential reset signal ACTR can be generated by the mode detection circuit 10 having a simple circuit configuration shown in FIG. 14 based on the existing mode signal (switch control signal ACTH). Therefore, the resetting of the gate potential Vg of the charge-transfer transistor M1 of each of the booster cells 81 to 84 can be performed with a simple circuit configuration.

In this embodiment, the gate voltage Vg of the charge-transfer transistor M1 was reset to a potential equal to the drain voltage Vd for all the booster cells 81 to 84. Alternatively, the gate voltage Vg of the charge-transfer transistor M1 may be reset for only part of the booster cells including the final-stage booster cell, as required.

Embodiment 7

Figure 17:
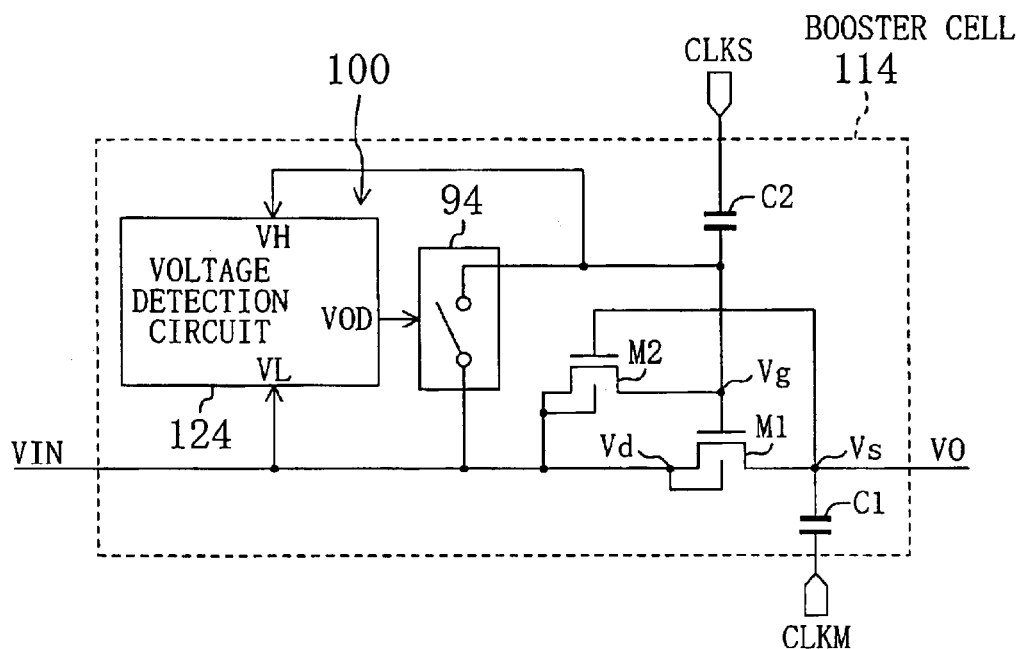
FIG. 17 is a circuit diagram of a booster cell of the booster circuit of Embodiment 7.
Figure 18:
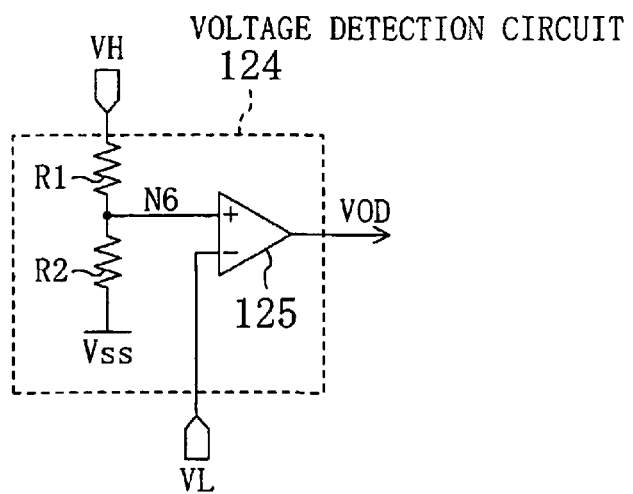
FIG. 18 is a circuit diagram of an example of a voltage detection circuit of the booster cell of FIG. 17.

A booster circuit of Embodiment 7 will be described with reference to FIGS. 16 to 18. In this embodiment, when the potential difference between the gate voltage and the drain voltage of the charge-transfer transistor M1 is greater than a predetermined potential difference, the gate terminal of the charge-transfer transistor M1 is automatically connected to the drain terminal thereof, to reset the gate potential.

Figure 16:
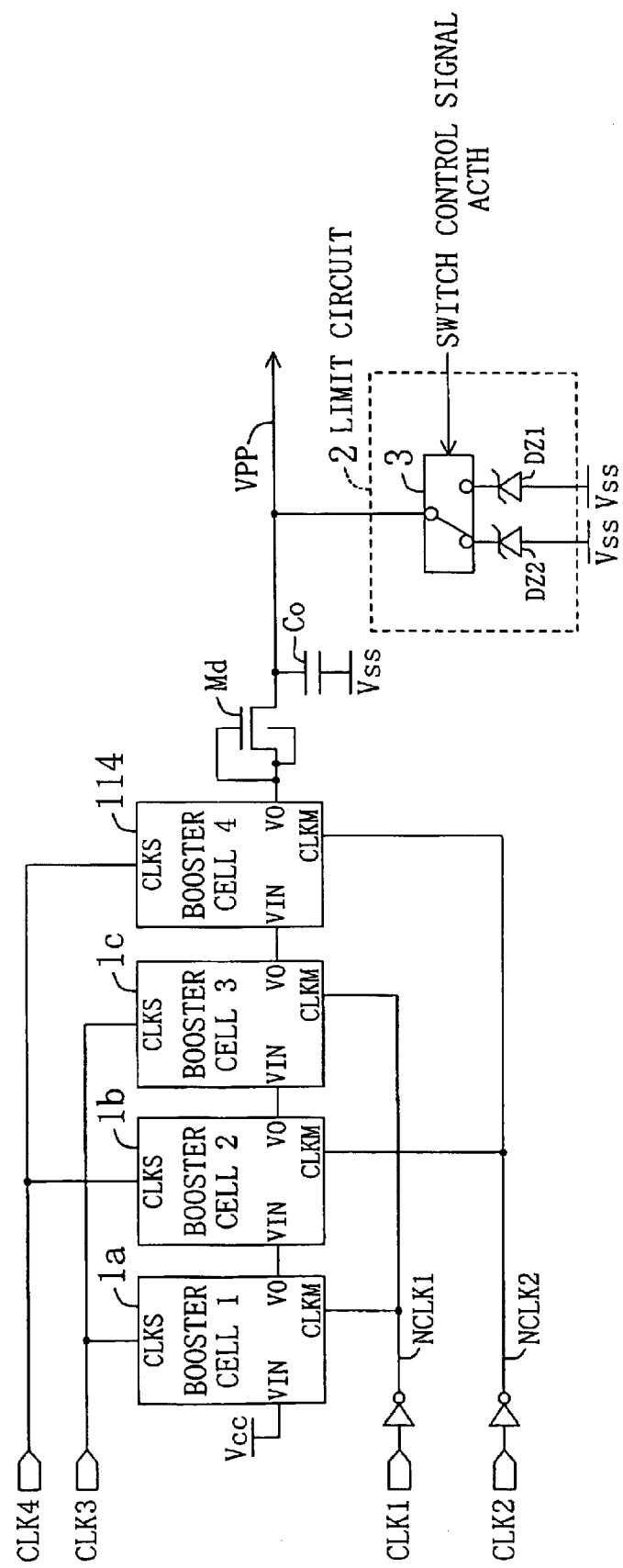
FIG. 16 is a block diagram of a booster circuit of Embodiment 7 of the present invention.
Figure 23:
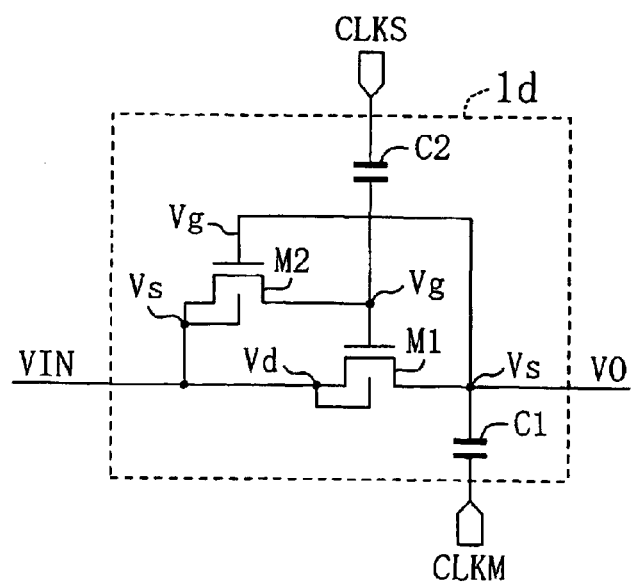
FIG. 23 is a circuit diagram of a booster cell of the conventional booster circuit.
Figure 24:
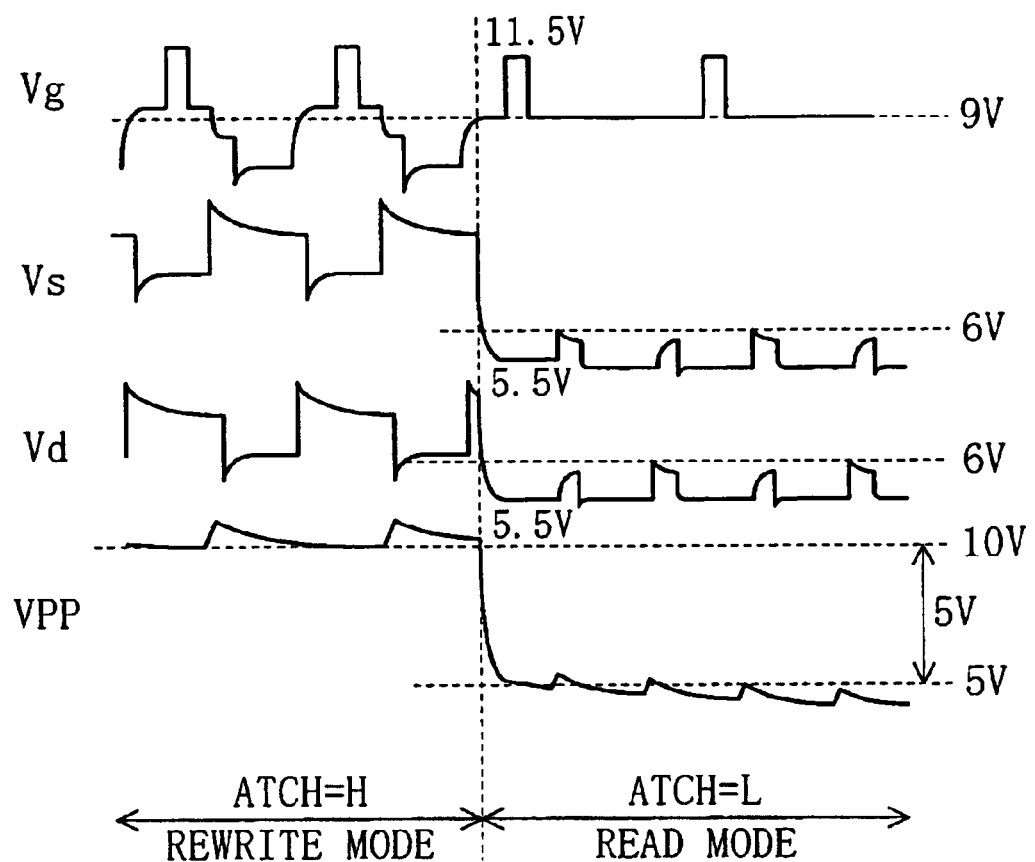
FIG. 24 is a timing chart demonstrating the operation of the conventional booster circuit.

Referring to FIG. 16, first-stage, second-stage and third-stage booster cells 1a to 1c have the same configuration as the conventional booster cell 1d shown in FIG. 23. In this embodiment, a fourth-stage booster cell 114 includes a voltage detection circuit 124 and a voltage reset switch 94 as shown in FIG. 17. The voltage reset switch (switch means) 94 switches the connection between the gate terminal and the drain terminal of the charge-transfer transistor M1. As shown in FIG. 18, the voltage detection circuit (control circuit) 124 includes two resistances R1 and R2 connected in series between the gate terminal of the charge-transfer transistor M1 of the booster cell 114 via a terminal VH and the ground terminal, and a voltage comparator 125 using a differential amplifier.

The voltage comparator 125 receives a potential VN6 at node N6 between the resistances R1 and R2 at a non-inverted input terminal and the drain potential Vd of the charge-transfer transistor M1 at an inverted input terminal via a terminal VL, compares the potentials at the two input terminals, and outputs the results to the voltage reset circuit 94 via an output terminal VOD as the gate voltage reset signal ACTR. The comparison is performed in the following manner. Assuming, for example, that the resistances R1 and R2 have the same resistance value, the potential VN6 at node N6 is (½)×Vg where Vg is the gate potential of the charge-transfer transistor M1. Therefore, if the potential VN6>Vd, for example, the voltage comparator 125 outputs "H" level as the gate voltage reset signal ACTR. Receiving the "H" level signal, the voltage reset switch 94 is turned ON, connecting the gate terminal and the drain terminal of the charge-transfer transistor M1 and thereby resetting the gate potential Vg to a predetermined reset potential equal to the drain potential Vd. As a result, VN6 becomes (½)×Vd<Vd. Therefore, the voltage comparator 125 outputs "L" level as the gate voltage reset signal ACTR, turning OFF the voltage reset switch 94.

The voltage reset switch 94 and the voltage detection circuit 124 together constitute an automatic reset means 100 in which, if the potential difference between the gate potential Vg and the drain potential Vd of the charge-transfer transistor M1 is greater than a predetermined potential difference ((½)×Vg−Vd>0), the gate potential Vg of the charge-transfer transistor M1 is reset to a predetermined reset potential equal to the drain potential Vd.

Assuming that the gate voltage Vg and the drain voltage Vd of the charge-transfer transistor M1 are 11.4 V and 5.5 V, respectively, for example, the potential VN6 satisfies VN6=5.7 V>5.5 V=Vd. The voltage comparator 125 therefore outputs "H" level as the gate voltage reset signal ACTR, turning ON the voltage reset switch 94 and thus resetting the gate potential Vg of the charge-transfer transistor M1 to the drain potential Vd thereof. As a result, since VN6=(½)×Vd<Vd is satisfied, the voltage comparator 125 outputs "L" level as the gate voltage reset signal ACTR, turning OFF the voltage reset switch 94. In this way, the problem in the boost operation that the charge-transfer transistor M1 remains in the ON state is prevented As described above, in this embodiment, when the charge-transfer transistor M1 is in the ON state with the gate voltage remaining higher than the input voltage by a value equal to or greater than the threshold voltage of this transistor, such as during a specific mode transition and during a restart after an instantaneous powder interruption, the voltage reset switch 94 is turned ON according to the signal from the voltage detection circuit 124. This automatically resets the gate potential Vg of the charge-transfer transistor to a potential equal to the input potential (drain potential Vd). Therefore, the problem in the boot operation that the charge-transfer transistor remains in the ON state is prevented, stable current supply capability can be ensured after the mode transition or the restart, and thus a highly reliable booster circuit can be attained.

In this embodiment, the gate voltage Vg of the charge-transfer transistor M1 was automatically reset to the drain voltage Vd for the final-stage (fourth-stage) booster cell 114. Alternatively, naturally, the number of booster cells for which the voltage reset switch 94 and the voltage detection circuit 125 are provided may be increased.

In this embodiment, the gate voltage Vg of the charge-transfer transistor M1 of the booster cell 114 was automatically reset to a potential equal to the drain voltage Vd. Alternatively, naturally, the gate voltage Vg may be reset to the ground potential Vss, the supply potential Vcc, or another predetermined potential.

Embodiment 8

Figure 19:
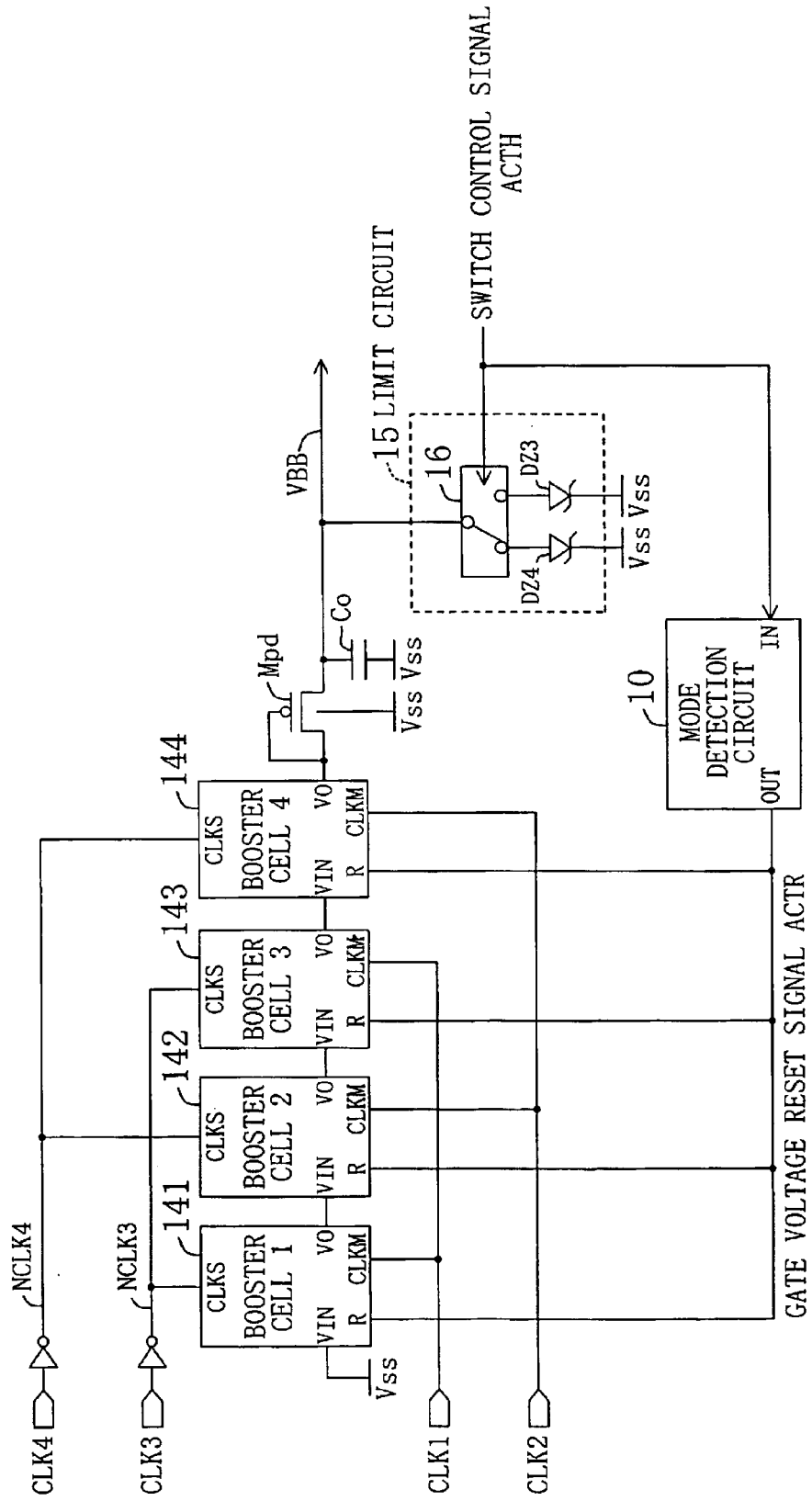
FIG. 19 is a block diagram of a negative booster circuit of Embodiment 8 of the present invention.
Figure 20:
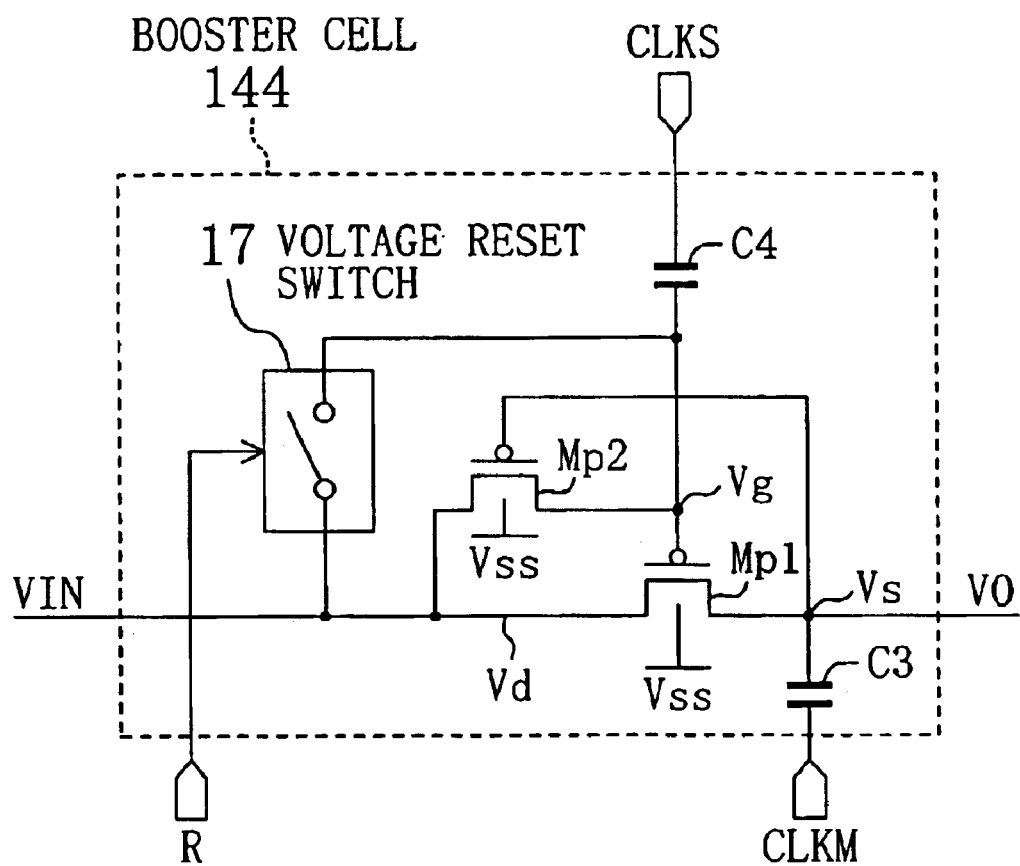
FIG. 20 is a circuit diagram of a booster cell of the negative booster circuit of Embodiment 8.
Figure 21:
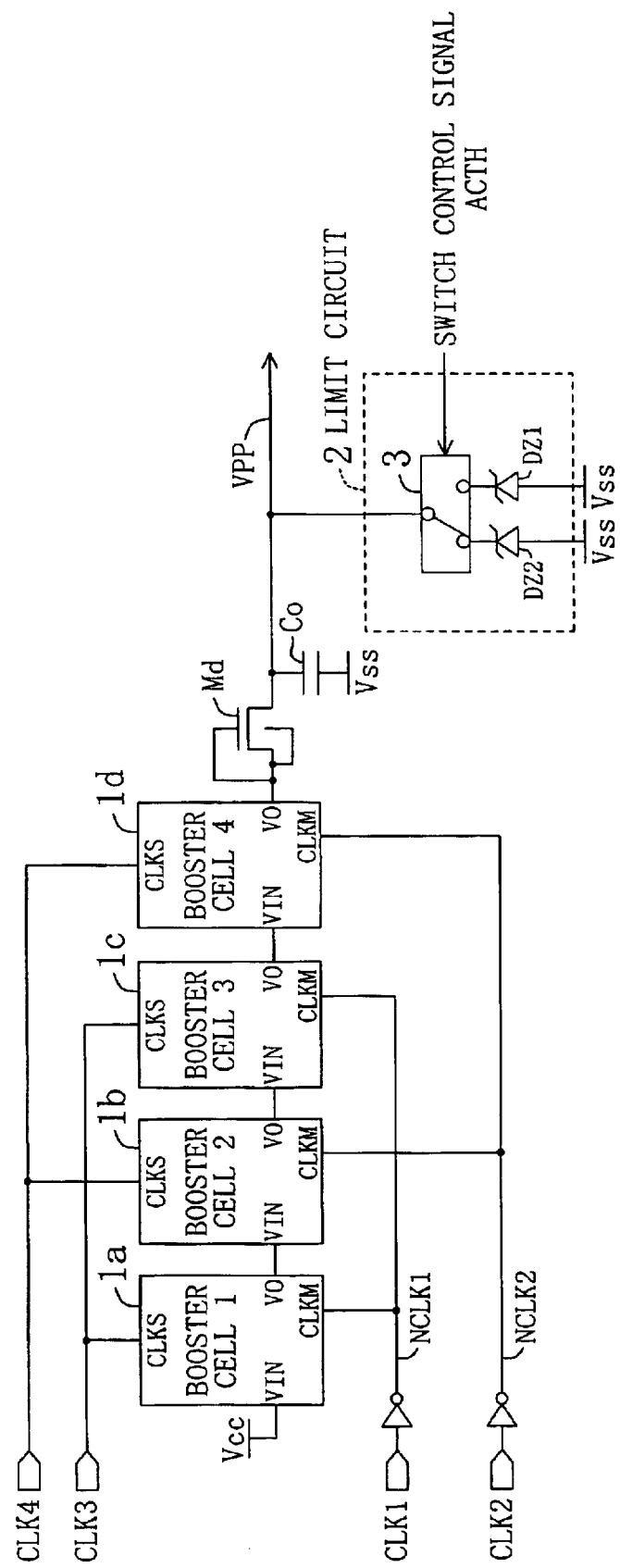
FIG. 21 is a block diagram of a conventional booster circuit.

FIGS. 19 and 20 show a booster circuit of Embodiment 8 of the present invention. The feature of this embodiment is that the booster circuit serves as a negative booster circuit for generating a negatively high voltage by performing negative-going boost operation.

Figure 13:
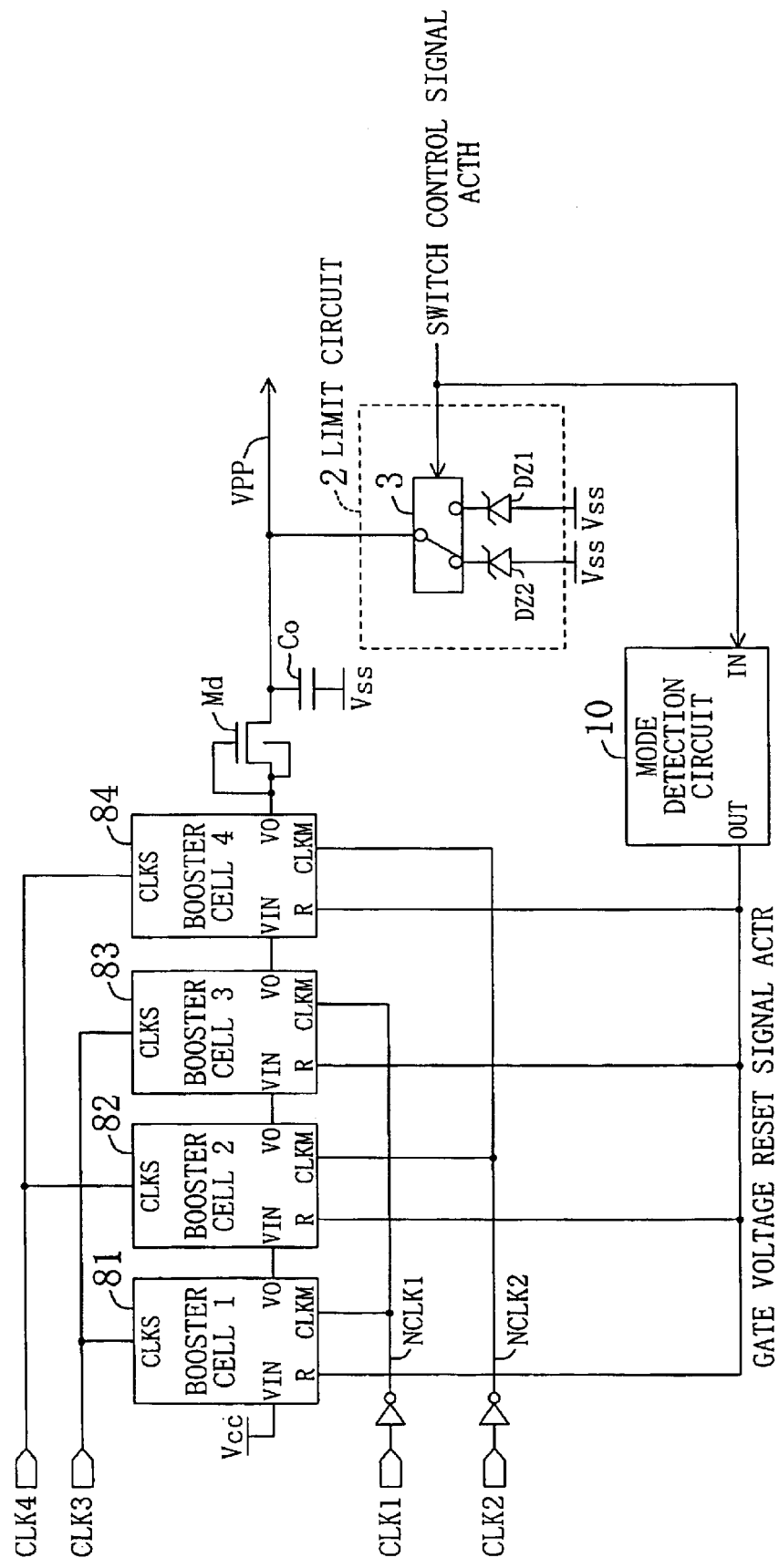
FIG. 13 is a block diagram of a booster circuit of Embodiment 6 of the present invention.

The configuration of the booster circuit shown in FIG. 19 is basically the same as that shown in FIG. 13, except for the following points. As shown in FIG. 20, each of booster cells 141 to 144 includes a P-channel transistor Mp1 as the charge-transfer transistor and a P-channel transistor Mp2 as the switching transistor. The rectifying transistor shown in FIG. 19 is composed of a P-channel transistor Mpd. A limit circuit 15 has two Zener diodes DZ3 and DZ4 having the inverted polarity.

FIG. 19 shows a four-stage negative booster circuit with the four booster cells 141 to 144 connected in series. The rectifying transistor Mpd is connected to the output of the final-stage (fourth-stage) booster cell 144. The limit circuit 15, for switching the output voltage VBB according to the switch control signal ACTH, and the smoothing capacitor Co are connected to the output of the rectifying transistor Mpd. Each of the booster cells 141 to 144 is driven with two boost clock signals having different phases (CLK1 and CLK3 or CLK2 and CLK4) as shown in FIG. 22.

The booster cells 141 to 144 are identical in configuration to each other. FIG. 20 shows an internal configuration of the final-stage booster cell 144 as a specific example typifying the booster cells. Referring to FIG. 20, each of the booster cells 141 to 144 includes the P-channel charge-transfer transistor Mp1, the P-channel switching transistor Mp2, an output voltage boost capacitor C3, a gate voltage boost capacitor C4, and a voltage reset switch 17. The voltage reset switch 17 receives the gate voltage reset signal ACTR via a reset terminal R, and connects the gate terminal and the drain terminal of the charge-transfer transistor Mp1 of each of the booster cells 141 to 144, to allow the gate potential Vg of the charge-transfer transistor Mp1 to be reset to a potential equal to the drain potential Vd when the gate voltage reset signal ACTR is active. When the gate voltage reset signal ACTR is inactive, the voltage reset switch 17 disconnects the gate terminal of the charge-transfer transistor Mp1 of each of the booster cells 141 to 144 from the drain terminal thereof.

The limit circuit 15 shown in FIG. 19 is essentially composed of the read Zener diode DZ3 used for read operation, the erase Zener diode DZ4 used for erase operation, and a switch 16. The breakdown voltages of the read Zener diode DZ3 and the erase Zener diode DZ4 are −5 V and −10 V, respectively. The mode detection circuit 10 has the internal configuration shown in FIG. 14 described above, and potential changes at nodes N1 to N5 are as shown in the timing chart of FIG. 15 described above. In this embodiment, the booster cells 141 to 144 are not necessarily identical to each other in the sizes of the charge-transfer transistor Mp1, the switching transistor Mp2, the output voltage boost capacitor C3 and the gate voltage boost capacitor C4 constituting the booster cell.

The operation of the negative booster circuit having the configuration described above will be described.

The boost clock signals CLK1 and CLK2 shown in FIG. 19 are received by the booster cells 141 to 144 as one input signal. The boost clock signals CLK3 and CLK4 are inverted in logic and the inverted boost clock signals NCLK3 and NCLK4 are received by the booster cells 141 to 144 as another input signal. The clock signals CKL1 to CKL4 are square waves having predetermined "H" and "L" durations and cycles.

In the negative booster circuit of FIG. 19, negative charge is stored in the output voltage boost capacitors C3 of the booster cells sequentially, starting from the first-stage booster cell 141 to the second-stage, third-stage and fourth-stage cells, to finally obtain an arbitrary negatively high voltage. As in the positive booster circuit described above, during transfer of a negative boosted voltage from the output voltage boost capacitor C3 of the preceding booster cell to the output voltage boost capacitor C3 of the current booster cell, the inverted boost clock signal NCLK3 or NCLK4 input to the gate voltage boost capacitor C4 of the current booster cell is changed from the supply potential to the ground potential at a predetermined timing, to thereby suppress potential rise of the negative boosted voltage transferred from the preceding booster cell.

The boosted voltage transferred from the preceding booster cell is further negatively boosted by changing the input boost clock signal CLK1 or CLK2 from the supply potential to the ground potential. By this operation, it is possible to further negatively boost the potential negatively boosted by the preceding booster cell by a predetermined potential. By repeating this series of operation, a negative boosted voltage lower than the ground potential Vss can be generated.

The limit circuit 15 switches the output voltage VBB to a predetermined voltage according to the received switch control signal ACTH. For example, during erase operation requiring a high negative voltage, the switch control signal ACTH is asserted, to connect the erase Zener diode DZ4 to the output terminal of the negative booster circuit so that the output voltage VBB is clamped to −10V. During the write operation requiring a low negative voltage, the switch control signal ACTH is negated, to connect the write Zener diode DZ3 to the output terminal of the booster circuit so that the output voltage VBB is clamped to −5V. In this way, the output voltage VBB of the booster circuit can be changed according to the operation mode before supply for use.

Assume that the switch control signal ACTH changes from "H" to "L", indicating, for example, an abrupt transition from the erase operation mode for output of a high negative boosted voltage to the write operation mode for output of a low negative boosted voltage. In this case, the source voltage Vs and the drain voltage Vd of the charge-transfer transistor Mp1 of the fourth-stage booster cell 144 abruptly increase and become roughly an identical potential, on a principle similar to that for the positive booster circuit described above. This causes the switching transistor Mp2 to remain in the cut-off state irrespective of the boost clock signals CLK2 and CLK4, and thus the gate potential Vg of the charge-transfer transistor Mp1 is left as a high negative voltage.

Detecting the change of the switch control signal ACTH from the active state to the inactive state, the mode detection circuit 10 changes the gate voltage reset signal ACTR to the active state from the inactive state for a set time period (about 10 ns). With the active gate voltage reset signal ACTR, the voltage reset switch 17 of each of the booster cells 141 to 144 is ON for the set time period, allowing the gate potential Vg of the charge-transfer transistor Mp1 of the booster cell to be reset to a potential equal to the drain potential Vd.

After termination of the reset operation, the voltage reset switch 17 is turned OFF with the change of the gate voltage reset signal ACTR to the inactive state from the active state. Thereafter, normal negative boost operation can be secured without lose of the negative boosted charge when the gate voltage of the charge-transfer transistor Mp1 is gradually negatively boosted. Therefore, the problem in the boost operation that the charge-transfer transistor Mp1 remains in the ON state is prevented.

As described above, in this embodiment, in the negative booster circuit for generating a negatively high voltage, when the output potential abruptly changes from a high negative voltage to a low negative voltage during a mode transition, the gate potential Vg of the charge-transfer transistor Mp1 is forcibly reset to a potential equal to the drain potential Vd, to thereby prevent the problem in the boost operation that the charge-transfer transistor Mp1 remains in the ON state. Therefore, stable current supply capability can be ensured after the mode transition, and thus a highly reliable booster circuit can be attained.

In addition, since the gate voltage of the charge-transfer transistor Mp1 is reset to a potential equal to the drain voltage, waste of the negative boosted charge due to the reset operation can be minimized, and also the time required to reach the steady state of the negative boost operation can be most shortened. Thus, reduction of power consumption and shortening of the wait time until voltage stability can be attained considerably effectively.

Moreover, the reset operation can be performed using the existing mode signal (switch control signal) ACTH with the mode detection circuit 10. Therefore, reset operation with a simple circuit configuration is attained.

In this embodiment, the gate potential of the charge-transfer transistor Mp1 was reset to a potential equal to the drain potential for all the booster cells 141 to 144. Alternatively, the gate voltage Vg of the charge-transfer transistor Mp1 may be reset for part of the booster cells including the final-stage booster cell. In this case, the number of voltage reset switches 17 can be reduced, and this enables reduction in area and cost.

In Embodiments 1 to 8 described above, four-stage booster cells were used. However, the number of booster cells is not limited to four.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A booster circuit comprising n-stage (n is an integer equal to or more than 2) booster cells connected in series, at least a booster cell among the n booster cells comprising:
 a charge-transfer transistor for transferring an output voltage received from the preceding stage to the following stage;
 an output voltage boost capacitor having one electrode connected to the output of the charge-transfer transistor and the other electrode receiving a first clock signal having a predetermined phase;
 a gate voltage boost capacitor having one electrode connected to the gate of the charge-transfer transistor and the other electrode receiving a second clock signal having a predetermined phase; and
 a switching transistor for connecting the gate of the charge-transfer transistor to the input of the charge-transfer transistor, wherein the booster circuit comprises reset means for receiving a control signal and resetting a gate voltage of the charge-transfer transistor of at least the booster cell to a predetermined reset potential based on the control signal, the absolute value of the predetermined reset potential being higher than the supply voltage.

2. The booster circuit of claim 1, wherein the at least a booster cell among the n booster cells is the final-stage booster cell among the n booster cells.

3. The booster circuit of claim 2, wherein the control signal is output in an event that the gate voltage of the charge-transfer transistor of at least the final-stage booster cell remains higher than an input voltage of the charge-transfer transistor by a value equal to or greater than a predetermined voltage, and in this event, the reset means resets the gate voltage of the charge-transfer transistor of at least the final-stage booster cell to the predetermined reset potential.

4. The booster circuit of claim 3, wherein the control signal is output in an event that the gate voltage of the charge-transfer transistor of at least the final-stage booster cell remains higher than the input voltage and an output voltage of the charge-transfer transistor by a value equal to or greater than a predetermined voltage.

5. The booster circuit of claim 3, wherein the predetermined voltage is a voltage equal to a threshold voltage of the charge-transfer transistor.

6. The booster circuit of claim 3, wherein the control signal is output to the reset means during a specific mode transition, and during the specific mode transition, the reset means resets the gate voltage of the charge-transfer transistor of at least the final-stage booster cell to a predetermined reset potential.

7. The booster circuit of claim 3, wherein the control signal is output to the reset means during a startup of the booster circuit, and during the startup, the reset means resets the gate voltage of the charge-transfer transistor of at least the final-stage booster cell to a predetermined reset potential.

8. The booster circuit of claim 2, wherein the predetermined reset potential for the gate voltage of the charge-transfer transistor is set at a voltage value higher than the supply voltage when positive-going boost operation is performed.

9. The booster circuit of claim 2, wherein the resetting of the gate voltage of the charge-transfer transistor to a predetermined reset potential by the reset means is performed for a plurality of booster cells, and the predetermined reset potential for the gate voltage of the charge-transfer transistor of one of the plurality of booster cells is set at a potential equal to or higher than the predetermined reset potential for the preceding-stage booster cell when positive-going boost operation is performed.

10. The booster circuit of claim 8, wherein the reset means comprises:

boost means for receiving the control signal, amplifying the amplitude of the control signal, and outputting the amplified signal; and a reset circuit for receiving the output of the boost means and resetting the gate voltage of the charge-transfer transistor of at least the final-stage booster cell to a predetermined reset potential exceeding the supply voltage.

11. The booster circuit of claim 2, wherein the reset means resets the gate voltage of the charge-transfer transistor of at least the final-stage booster cell to a predetermined reset potential equal to a voltage input to the charge-transfer transistor.

12. The booster circuit of claim 2, further comprising control signal generation means for receiving a predetermined control signal originally generated for control of the booster circuit, detecting a change of the predetermined control signal, asserting the control signal for a set time period, and outputting the control signal to the reset means.

13. The booster circuit of claim 1, wherein the booster circuit performs negative-going boost operation.

14. The booster circuit of claim 1, wherein output of the charge-transfer transistor and a gate of the switching transistor are connected.

15. The booster circuit of claim 1, wherein the predetermined reset potential is a voltage that turns OFF the charge-transfer transistor.

16. A booster circuit comprising n-stage (n is an integer equal to or more than 2) booster cells connected in series, at least the final-stage booster cell among the n booster cells comprising:

a charge-transfer transistor for transferring an output voltage received from the preceding stage to the following stage;

an output voltage boost capacitor having one electrode connected to the output of the charge-transfer transistor and the other electrode receiving a first clock signal having a predetermined phase;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises automatic reset means for resetting a gate voltage of the charge-transfer transistor to a predetermined reset potential when the voltage difference between the gate voltage and an input voltage of the charge-transfer transistor is greater than a predetermined potential difference.

17. The booster circuit of claim 16, wherein the automatic reset means comprises:

switch means for connecting the gate of the charge-transfer transistor to the input of the charge-transfer transistor; and a control circuit for comparing the gate voltage and the input voltage of the charge-transfer transistor to obtain a voltage difference, activating the switch means when the voltage difference is greater than a predetermined potential difference, to connect the gate of the charge-transfer transistor to the input terminal of the charge-transfer transistor.

18. A booster circuit comprising n-stage (n is an integer equal to or more than 2) booster cells connected in series, at least the final-stage booster cell among the n booster cells comprising:

a charge-transfer transistor for transferring an output voltage received from the preceding stage to the following stage;

an output voltage boost capacitor for storing charge by receiving a first clock signal having a predetermined phase and boosting the output voltage received from the preceding stage;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises reset means for receiving a control signal and resetting a gate voltage of the charge-transfer transistor of at least the final-stage booster cell to a predetermined reset potential based on the control signal, the absolute value of the predetermined reset potential being higher than the supply voltage.

19. A booster circuit comprising n-stage (n is an integer equal to or more than 2) booster cells connected in series, at least the final-stage booster cell among the n booster cells comprising:

a charge-transfer transistor for transferring an output voltage received from the preceding stage to the following stage;

an output voltage boost capacitor for storing charge by receiving a first clock signal having a predetermined phase and boosting the output voltage received from the preceding stage;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises automatic reset means for resetting a gate voltage of the charge-transfer transistor to a predetermined reset potential when the voltage difference between the gate voltage and an input voltage of the charge-transfer transistor is greater than a predetermined potential difference.

20. A booster circuit boosting an input voltage from an input section and output a boosted voltage through an output section comprising:

a charge-transfer transistor connected between the input section and the output section;

an output voltage boost capacitor having one electrode connected to the output of the charge-transfer transistor and the other electrode receiving a first clock signal having a predetermined phase;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises reset means for receiving a control signal and resetting a gate voltage of the charge-transfer transistor to a predetermined reset potential based on the control signal, the absolute value of the predetermined reset potential being higher than the supply voltage.

21. The booster circuit of claim 20, wherein output of the charge-transfer transistor and a gate of the switching transistor are connected.

22. The booster circuit of claim 21, wherein the predetermined reset potential is a voltage that turns OFF the charge-transfer transistor.

23. The booster circuit of claim 20, wherein the control signal is output in an event that the gate voltage of the charge-transfer transistor remains higher than an input voltage of the charge-transfer transistor by a value equal to or greater than a predetermined voltage, and in this event, the reset means resets the gate voltage of the charge-transfer transistor to the predetermined reset potential.

24. The booster circuit of claim 23, wherein the control signal is output in an event that the gate voltage of the charge-transfer transistor remains higher than the input voltage and an output voltage of the charge-transfer transistor by a value equal to or greater than a predetermined voltage.

25. The booster circuit of claim 23, wherein the predetermined voltage is a voltage equal to a threshold voltage of the charge-transfer transistor.

26. The booster circuit of claim 23, wherein the control signal is output to the reset means during a specific made transition, and during the specific mode transition, the reset means resets the gate voltage of the charge-transfer transistor to a predetermined reset potential.

27. The booster circuit of claim 23, wherein the control signal is output to the reset means during a startup of the booster circuit, and during the startup, the reset means resets the gate voltage of the charge-transfer transistor to a predetermined reset potential.

28. The booster circuit of claim 22, wherein the predetermined reset potential for the gate voltage of the charge-transfer transistor is set at a voltage value higher than the supply voltage when positive-going boost operation is performed.

29. The booster circuit of claim 22, wherein the resetting of the gate voltage of the charge-transfer transistor to a predetermined reset potential by the reset means is performed for a plurality of booster cells, and the predetermined reset potential for the gate voltage of the charge-transfer transistor of one of the plurality of booster cells is set at a potential equal to or higher than the predetermined reset potential for the preceding-stage booster cell when positive-going boost operation is performed.

30. The booster circuit of claim 28, wherein the reset means comprises:

boost means for receiving the control signal, amplifying the amplitude of the control signal, and outputting the amplified signal; and a reset circuit for receiving the output of the boost means and resetting the gate voltage of the charge-transfer transistor to a predetermined reset potential exceeding the supply voltage.

31. The booster circuit of claim 22, wherein the reset means resets the gate voltage of the charge-transfer transistor to a predetermined reset potential equal to a voltage input to the charge-transfer transistor.

32. The booster circuit of claim 22, further comprising control signal generation means for receiving a predetermined control signal originally generated for control of the booster circuit, detecting a change of the predetermined control signal, asserting the control signal for a set time period, and outputting the control signal to the reset means.

33. The booster circuit of claim 20, wherein the booster circuit performs negative-going boost operation.

34. A booster circuit boosting an input voltage from an input section and output a boosted voltage through an output section comprising:

a charge-transfer transistor connected between the input section and the output section;

an output voltage boost capacitor having one electrode connected to the output of the charge-transfer transistor and the other electrode receiving a first clock signal having a predetermined phase;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises automatic reset means for resetting a gate voltage of the charge-transfer transistor to a predetermined reset potential when the voltage difference between the gate voltage and an input voltage of the charge-transfer transistor is greater than a predetermined potential difference.

35. The booster circuit of claim 34, wherein the automatic reset means comprises:

switch means for connecting the gate of the charge-transfer transistor to the input of the charge-transfer transistor, and a control circuit for comparing the gate voltage and the input voltage of the charge-transfer transistor to obtain a voltage difference, activating the switch means when the voltage difference is greater than a predetermined potential difference, to connect the gate of the charge-transfer transistor to the input of the charge-transfer transistor.

36. A booster circuit boosting an input voltage from an input section and output a boosted voltage through an output section comprising:

a charge-transfer transistor connected between the input section and the output section;

an output voltage boost capacitor for storing charge by receiving a first clock signal having a predetermined phase and boosting the input voltage;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises reset means for receiving a control signal and resetting a gate voltage of the charge-transfer transistor to a predetermined reset potential based on the control signal, the absolute value of the predetermined reset potential being higher than the supply voltage.

37. A booster circuit boosting an input voltage from an input section and output a boosted voltage through an output section comprising:

a charge-transfer transistor connected between the input section and the output section;

an output voltage boost capacitor for storing charge by receiving a first clock signal having a predetermined phase and boosting the input voltage;

a gate voltage boost capacitor having one electrode connected to the gate of the charge-transfer transistor and the other electrode receiving a second clock signal having a predetermined phase; and a switching transistor for connecting the gate of the charge-transfer transistor to the input of the charge-transfer transistor, wherein the booster circuit comprises automatic reset means for resetting a gate voltage of the charge-transfer transistor to a predetermined reset potential when the voltage difference between the gate voltage and an input voltage of the charge-transfer transistor is greater than a predetermined potential difference.

* * * * *